(12) United States Patent
Saito et al.

(10) Patent No.: US 10,662,321 B2
(45) Date of Patent: May 26, 2020

(54) CYCLIC OLEFIN COPOLYMER COMPOSITION AND CROSS-LINKED PRODUCT THEREOF

(71) Applicant: MITSUI CHEMICALS, INC., Tokyo (JP)

(72) Inventors: Junji Saito, Chiba (JP); Shigeo Kiba, Yokohama (JP); Hirohiko Murase, Ichihara (JP); Haruka Saito, Chiba (JP); Tomoaki Matsugi, Kisarazu (JP)

(73) Assignee: MITSUI CHEMICALS, INC., Tokyo (JP)

(*) Notice: Subject to any disclaimer, the term of this patent is extended or adjusted under 35 U.S.C. 154(b) by 105 days.

(21) Appl. No.: 16/079,993

(22) PCT Filed: Feb. 17, 2017

(86) PCT No.: PCT/JP2017/005907
§ 371 (c)(1),
(2) Date: Aug. 24, 2018

(87) PCT Pub. No.: WO2017/150218
PCT Pub. Date: Sep. 8, 2017

(65) Prior Publication Data
US 2019/0062541 A1 Feb. 28, 2019

(30) Foreign Application Priority Data

Feb. 29, 2016 (JP) .................. 2016-037462
Aug. 31, 2016 (JP) .................. 2016-169312

(51) Int. Cl.
| | | |
|---|---|---|
| C08L 23/16 | (2006.01) | |
| C08L 23/08 | (2006.01) | |
| C08J 3/24 | (2006.01) | |
| C09D 123/08 | (2006.01) | |
| C09D 123/16 | (2006.01) | |
| C08L 45/00 | (2006.01) | |
| C08G 61/06 | (2006.01) | |
| C08J 5/18 | (2006.01) | |
| C08J 5/24 | (2006.01) | |
| C08L 25/06 | (2006.01) | |

(52) U.S. Cl.
CPC .......... *C08L 23/0823* (2013.01); *C08G 61/06* (2013.01); *C08J 3/24* (2013.01); *C08J 5/18* (2013.01); *C08J 5/24* (2013.01); *C08L 23/08* (2013.01); *C08L 23/16* (2013.01); *C08L 45/00* (2013.01); *C09D 123/0823* (2013.01); *C09D 123/16* (2013.01); *C08L 25/06* (2013.01); *C08L 2312/00* (2013.01); *C08L 2314/06* (2013.01)

(58) Field of Classification Search
CPC ....................... C09D 123/0823; C09D 123/16; C08G 61/06; C08J 5/24; C08J 5/18; C08J 3/24; C08L 45/00; C08L 23/0823; C08L 23/16; C08L 2314/06; C08L 25/06; C08L 2312/00
See application file for complete search history.

(56) References Cited

U.S. PATENT DOCUMENTS

| | | | |
|---|---|---|---|
| 5,006,616 A | 4/1991 | Hara | |
| 5,068,296 A | 11/1991 | Hara | |
| 5,571,868 A * | 11/1996 | Datta et al. ............. | B29C 43/24 525/211 |
| 6,350,832 B1 | 2/2002 | Bell | |
| 6,936,672 B2 | 8/2005 | Bell | |
| 9,206,278 B2 | 12/2015 | Yoshida | |
| 2003/0120006 A1 | 6/2003 | Bell | |
| 2009/0318597 A1* | 12/2009 | Squire et al. ....... | C08L 23/0823 524/261 |
| 2012/0071605 A1 | 3/2012 | Baugh et al. | |
| 2013/0178575 A1 | 7/2013 | Yoshida | |
| 2018/0148526 A1 | 5/2018 | Ewart | |

FOREIGN PATENT DOCUMENTS

| | | |
|---|---|---|
| EP | 0608903 B1 | 8/1994 |
| JP | S64009218 A | 1/1989 |
| JP | 2006-313660 A | 11/2006 |
| JP | 2007-160720 A | 6/2007 |
| JP | 2010100843 A | 5/2010 |

(Continued)

OTHER PUBLICATIONS

International Search Report dated Mar. 28, 2017 filed in PCT/JP2017/005907.
Japanese Office Action (JPOA) dated Sep. 10, 2019 issued for the corresponding Japanese patent application No. 2018-503030.
Extended European Search Report (EESR) dated Sep. 13, 2019 issued for the corresponding European patent application No. 17759687.1.

*Primary Examiner* — Nathan M Nutter
(74) *Attorney, Agent, or Firm* — Rankin, Hill & Clark LLP

(57) ABSTRACT

The cyclic olefin copolymer composition of the present invention includes a cyclic olefin copolymer (m) including a specific amount of a specific repeating unit and a cyclic olefin copolymer (n) different from the cyclic olefin copolymer (m). The cyclic olefin copolymer (n) includes at least one type selected from a copolymer (n1) of ethylene or α-olefin and cyclic olefin (where the copolymer (n1) does not include a repeating unit derived from specific cyclic non-conjugated dienes) and a cyclic olefin ring-opening polymer (n2), and when a total amount of the cyclic olefin copolymer (m) and the cyclic olefin copolymer (n) is 100% by mass, a content of the cyclic olefin copolymer (m) is 5% by mass or more to 95% by mass or less, and a content of the cyclic olefin copolymer (n) is 5% by mass or more to 95% by mass or less.

16 Claims, No Drawings

(56) References Cited

FOREIGN PATENT DOCUMENTS

| | | | |
|---|---|---|---|
| JP | 2015067822 | A | 4/2015 |
| JP | 2015-193680 | A | 11/2015 |
| JP | 2015209464 | A | 11/2015 |
| WO | 200034344 | A1 | 6/2000 |
| WO | 2008018952 | A1 | 2/2008 |
| WO | 2012046443 | A1 | 4/2012 |
| WO | 2016191076 | A1 | 12/2016 |

* cited by examiner

CYCLIC OLEFIN COPOLYMER COMPOSITION AND CROSS-LINKED PRODUCT THEREOF

TECHNICAL FIELD

The present invention relates to a cyclic olefin copolymer composition and a cross-linked product thereof.

BACKGROUND ART

In recent years, increases in the number of wireless communication devices and the like using high frequency bands and increases in communication speeds have inevitably led to higher frequency bands being widely used. Along with this, there is a demand for circuit substrates having a small dielectric tangent to reduce transmission loss at high frequencies as much as possible.

Examples of resin materials used for such circuit substrates include the cyclic olefin copolymers obtained by copolymerizing a diene described in Patent Document 1 and Patent Document 2.

Patent Document 1 and Patent Document 2 disclose that a sheet obtained by cross-linking a cyclic olefin copolymer obtained by copolymerizing a specific diene compound with an organic peroxide or the like exhibits excellent dielectric characteristics.

Furthermore, Patent Document 3 discloses resin compositions including a cyclic olefin copolymer obtained by copolymerizing a specific diene compound and various resins. However, Patent Document 3 does not disclose any techniques regarding specific measures for improving the dielectric characteristics.

RELATED DOCUMENT

Patent Document

[Patent Document 1] Japanese Unexamined Patent Publication No. 2010-100843
[Patent Document 2] International Publication No. 2012/046443
[Patent Document 3] Japanese Unexamined Patent Publication No. 2015-067822

SUMMARY OF THE INVENTION

Technical Problem

According to the studies of the present inventors, it is clear that the cross-linked product obtained from the cyclic olefin copolymer described in Patent Documents 1 to 3 does not yet have satisfactory dielectric characteristics in the high frequency band.

The present invention was made in view of the above circumstances and provides a cyclic olefin copolymer composition capable of obtaining a cross-linked product excellent in dielectric characteristics in a high frequency band and heat resistance, which is suitable for a circuit substrate or the like.

Solution to Problem

As a result of intensive investigations to solve the above problems, the present inventors found that, with respect to the cyclic olefin copolymer obtained by copolymerizing a specific diene compound, the mixing of a specific cyclic olefin copolymer improves the dielectric characteristics in the high frequency band while satisfying the heat resistance demanded for a circuit substrate, thus completing the present invention.

The present invention is as follows.

[1]

A cyclic olefin copolymer composition including
a cyclic olefin copolymer (m); and
a cyclic olefin copolymer (n) different from the cyclic olefin copolymer (m),
in which the cyclic olefin copolymer (m) includes
(A) a repeating unit derived from one or more olefins represented by General Formula (I),
(B) a repeating unit derived from one or more cyclic non-conjugated dienes represented by General Formula (III), and
(C) a repeating unit derived from one or more cyclic olefins represented by General Formula (V),
when a total molar number of the repeating units in the cyclic olefin copolymer (m) is 100 mol %, a content of the repeating unit (A) derived from the olefins is 10 mol % or more to 90 mol % or less, a content of the repeating unit (B) derived from the cyclic non-conjugated dienes is 1 mol % or more to 40 mol % or less, and a content of the repeating unit (C) derived from the cyclic olefins is 1 mol % or more to 30 mol % or less,
the cyclic olefin copolymer (n) includes at least one selected from a copolymer (n1) of ethylene or α-olefin and cyclic olefin (where the copolymer (n1) does not include a repeating unit derived from cyclic non-conjugated dienes represented by General Formula (III)) and a cyclic olefin ring-opening polymer (n2), and
when a total amount of the cyclic olefin copolymer (m) and the cyclic olefin copolymer (n) is 100% by mass, a content of the cyclic olefin copolymer (m) is 5% by mass or more to 95% by mass or less, and a content of the cyclic olefin copolymer (n) is 5% by mass or more to 95% by mass or less.

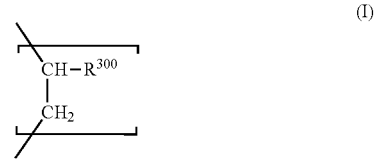

(in General Formula (I), $R^{300}$ indicates a hydrogen atom or a linear or branched hydrocarbon group having 1 to 29 carbon atoms)

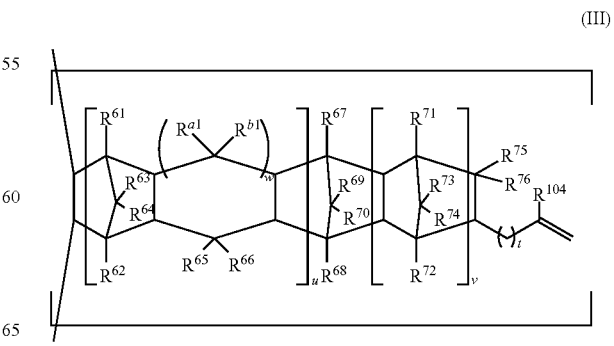

(in General Formula (III), u is 0 or 1, v is 0 or a positive or different, are a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, $R^{104}$ is a hydrogen atom or an alkyl group having 1 to 10 carbon atoms, t is a positive integer of 0 to 10, and $R^{75}$ and $R^{76}$ may bond with each other to form a monocyclic or polycyclic ring)

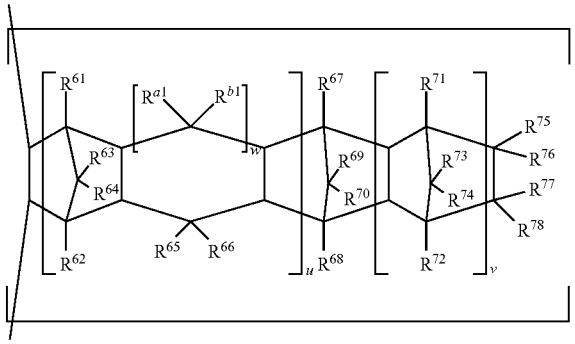

(V)

(in General Formula (V), u is 0 or 1, v is 0 or a positive integer, w is 0 or 1, $R^{61}$ to $R^{78}$ and $R^{a1}$ and $R^{b1}$, which may be the same or different, are a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, and $R^{75}$ to $R^{78}$ may bond with each other to form a monocyclic or polycyclic ring)

[2]

The cyclic olefin copolymer composition according to [1], in which the cyclic non-conjugated diene of the repeating unit (B) derived from the cyclic non-conjugated dienes is 5-vinyl-2-norbornene or 8-vinyl-9-methyltetracyclo[4.4.0.1$^{2,5}$.1$^{7,10}$]-3-dodecene.

[3]

The cyclic olefin copolymer composition according to [1] or [2], in which the cyclic olefin of the repeating unit (C) derived from the cyclic olefins is bicyclo[2.2.1]-2-heptene or tetracyclo[4.4.0.1$^{2,5}$.1$^{7,10}$]-3-dodecene.

[4]

The cyclic olefin copolymer composition according to any one of [1] to [3], further including an elastomer.

[5]

The cyclic olefin copolymer composition according to [4], in which a content of the elastomer is 1 part by mass or more to 50 parts by mass or less when the entire cyclic olefin copolymer composition is 100 parts by mass.

[6]

The cyclic olefin copolymer composition according to [4] or [5], in which the elastomer includes one or two or more selected from styrene-based elastomers, ethylene/propylene elastomers, and diene-based elastomers.

[7]

The cyclic olefin copolymer composition according to any one of [1] to [6], further including one or two or more additives selected from the group consisting of heat resistance stabilizers, weathering stabilizers, radiation resistant agents, plasticizers, lubricants, releasing agents, nucleating agents, frictional abrasion-improving agents, flame retardants, foaming agents, antistatic agents, coloring agents, anti-fogging agents, anti-blocking agents, impact resistance agents, surface wetting improvers, fillers, hydrochloric acid absorbers, and metal deactivators.

[8]

A varnish including the cyclic olefin copolymer composition according to any one of [1] to [7]; and a solvent.

[9]

A cross-linked product of the cyclic olefin copolymer composition according to any one of [1] to [7].

[10]

A film or sheet including the cross-linked product according to [9].

[11]

A laminate obtained by laminating the film or sheet according to [10] on a substrate.

[12]

A circuit substrate including an electrically insulating layer including the cross-linked product according to [9]; and a conductor layer provided on the electrically insulating layer.

[13]

An electronic device including the circuit substrate according to [12].

[14]

A prepreg including the cyclic olefin copolymer composition according to any one of [1] to [7]; and a sheet-like fiber substrate.

[15]

A foamed product obtained by cross-linking and foaming the cyclic olefin copolymer composition according to any one of [1] to [7].

[16]

A multi-layer formed article or a multi-layer laminated film obtained by forming the cyclic olefin copolymer composition according to any one of [1] to [7] with a thickness of 100 μm or less on a surface layer.

Advantageous Effects of Invention

According to the present invention, it is possible to provide a cyclic olefin copolymer composition capable of obtaining a cross-linked product excellent in dielectric characteristics in a high frequency band and heat resistance, which is suitable for a circuit substrate or the like.

DESCRIPTION OF EMBODIMENTS

A description will be given below of the present invention based on embodiments. In the present embodiment, "A to B" indicating a numerical range represents A or more to B or less unless otherwise specified.

First, a description will be given of the cyclic olefin copolymer composition of the embodiments according to the present invention.

The cyclic olefin copolymer composition of the present embodiment contains a cyclic olefin copolymer (m) and a cyclic olefin copolymer (n) different from the cyclic olefin copolymer (m).

When the total amount of the cyclic olefin copolymer (m) and the cyclic olefin copolymer (n) included in the cyclic olefin copolymer composition of the present embodiment is 100% by mass, the content of the cyclic olefin copolymer (m) is 5% by mass or more to 95% by mass or less, preferably 10% by mass or more to 90% by mass or less, more preferably 20% by mass or more to 80% by mass or less, and even more preferably 25% by mass or more to 75% by mass or less, while the content of the cyclic olefin copolymer (n) is 5% by mass or more to 95% by mass or less, preferably 10% by mass or more to 90% by mass or less, more preferably 20% by mass or more to 80% by mass or less, and even more preferably 25% by mass or more to 75% by mass or less.

A detailed description will be given below of each component.

[Cyclic Olefin Copolymer (m)]

The cyclic olefin copolymer (m) of the present embodiment includes (A) a repeating unit derived from one or more olefins represented by General Formula (I), (B) a repeating unit derived from one or more cyclic non-conjugated dienes represented by General Formula (III), and (C) a repeating unit derived from one or more cyclic olefins represented by General Formula (V).

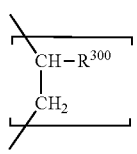

(I)

In General Formula (I), $R^{300}$ indicates a hydrogen atom or a linear or branched hydrocarbon group having 1 to 29 carbon atoms.

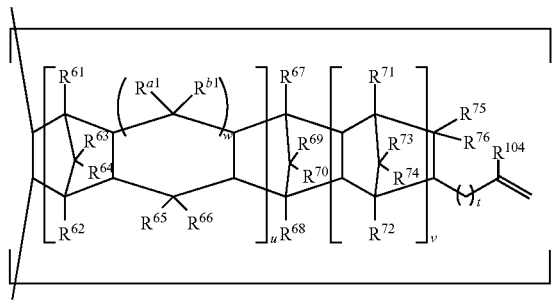

(III)

In General Formula (III), u is 0 or 1, v is 0 or a positive integer, preferably an integer of 0 to 2, and more preferably 0 or 1, w is 0 or 1, $R^{11}$ to $R^{76}$ and $R^{a1}$ and $R^{b1}$, which may be the same or different, are a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, $R^{104}$ is a hydrogen atom or an alkyl group having 1 to 10 carbon atoms, t is a positive integer of 0 to 10, $R^{75}$ and $R^{76}$ may bond with each other to form a monocyclic or polycyclic ring.

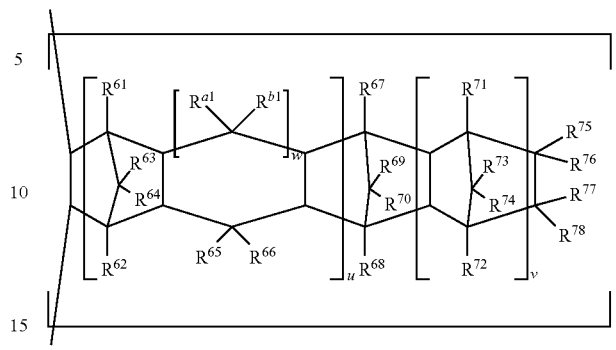

(V)

In General Formula (V), u is 0 or 1, v is 0 or a positive integer, preferably an integer of 0 to 2, and more preferably 0 or 1, w is 0 or 1, $R^{61}$ to $R^{78}$ and $R^{a1}$ and $R^{b1}$, which may be the same or different, are a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, and $R^{75}$ to $R^{78}$ may bond with each other to form a monocyclic or polycyclic ring.

In the cyclic olefin copolymer (m), in a case where the total molar number of the repeating units in the cyclic olefin copolymer (m) is 100 mol %, the content of the repeating unit (A) derived from olefins is 10 mol % or more to 90 mol % or less, preferably 15 mol % or more to 85 mol % or less, more preferably 20 mol % or more to 80 mol % or less, even more preferably 30 mol % or more to 80 mol % or less, yet more preferably 35 mol % or more to 80 mol % or less, and particularly preferably 40 mol % or more to 80 mol % or less, the content of the repeating unit (B) derived from cyclic non-conjugated dienes is 1 mol % or more to 40 mol % or less, preferably 2 mol % or more to 35 mol % or less, more preferably 3 mol % or more to 30 mol % or less, and the content of the repeating unit (C) derived from cyclic olefins is 1 mol % or more to 30 mol % or less, preferably 3 mol % or more to 25 mol % or less, and more preferably 5 mol % or more to 20 mol % or less.

When each of the contents of the repeating units in the cyclic olefin copolymer (m) is within the above range, the cross-linked product obtained from the cyclic olefin copolymer composition described above is excellent in terms of the stability over time of the dielectric property and also excellent in heat resistance. Furthermore, it is possible to obtain a cross-linked product (Q) having excellent mechanical properties, dielectric characteristics, transparency, and gas barrier properties. In other words, it is possible to obtain a cross-linked product (Q) excellent in terms of the balance of these physical properties.

The olefin monomer, which is one of the copolymerization raw materials of the cyclic olefin copolymer (m), is a monomer which provides the skeleton represented by Formula (I) by addition copolymerization, and is an olefin represented by General Formula (Ia).

(Ia)

In General Formula (Ia), $R^{300}$ indicates a hydrogen atom or a linear or branched hydrocarbon group having 1 to 29 carbon atoms. Examples of the olefin represented by General Formula (Ia) include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, and the like. From the viewpoint of obtaining a cross-linked product (Q) having superior heat resistance, mechanical properties, dielectric characteristics, transparency, and gas barrier properties, among the above, ethylene and propylene are preferable, and ethylene is particularly preferable. Two or more olefin monomers represented by Formula (Ia) may be used.

The cyclic non-conjugated diene monomer, which is one of the copolymerization raw materials of the cyclic olefin copolymer (m), is subjected to addition copolymerization to form a constituent unit represented by Formula (III). Specifically, a cyclic non-conjugated diene represented by General Formula (IIIa) corresponding to General Formula (III) is used.

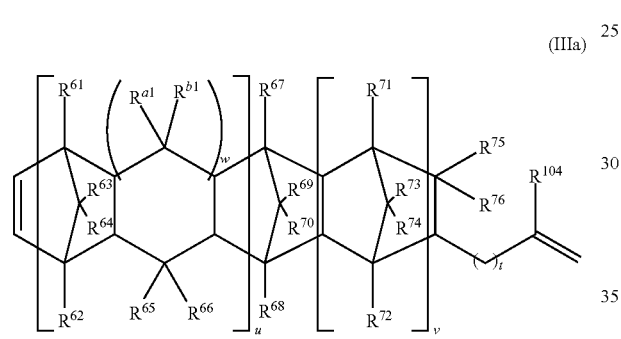

(IIIa)

In General Formula (IIIa), u is 0 or 1, v is 0 or a positive integer, preferably an integer of 0 to 2, and more preferably 0 or 1, w is 0 or 1, $R^{61}$ to $R^{76}$ and $R^{a1}$ and $R^{b1}$, which may be the same or different, are a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, $R^{104}$ is a hydrogen atom or an alkyl group having 1 to 10 carbon atoms, t is a positive integer of 0 to 10, $R^{75}$ and $R^{76}$ may bond with each other to form a monocyclic or polycyclic ring.

The cyclic non-conjugated diene represented by General Formula (IIIa) is not particularly limited and examples thereof include cyclic non-conjugated dienes represented by the chemical formulas below. Among these, 5-vinyl-2-norbornene, and 8-vinyl-9-methyltetracyclo[4.4.0.1$^{2,5}$.1$^{7,10}$]-3-dodecene are preferable, and 5-vinyl-2-norbornene is particularly preferable.

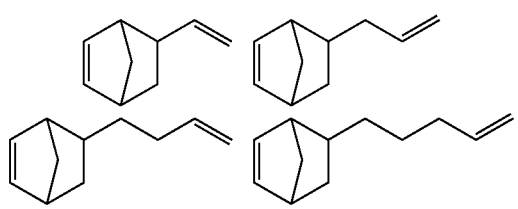

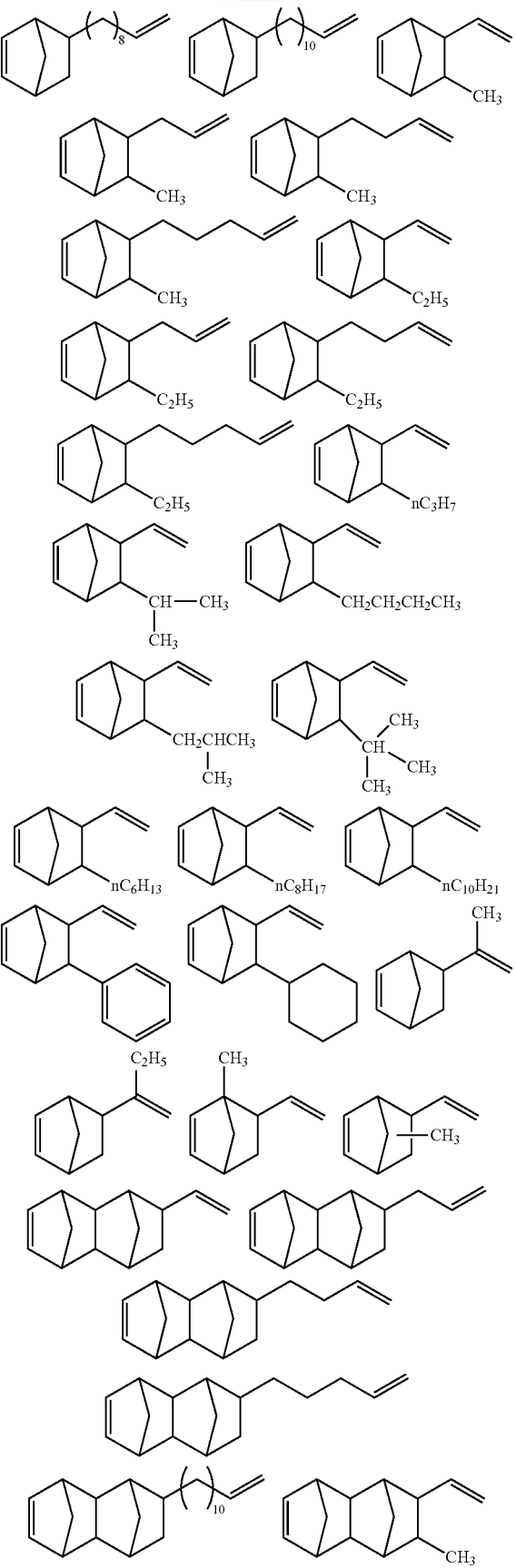

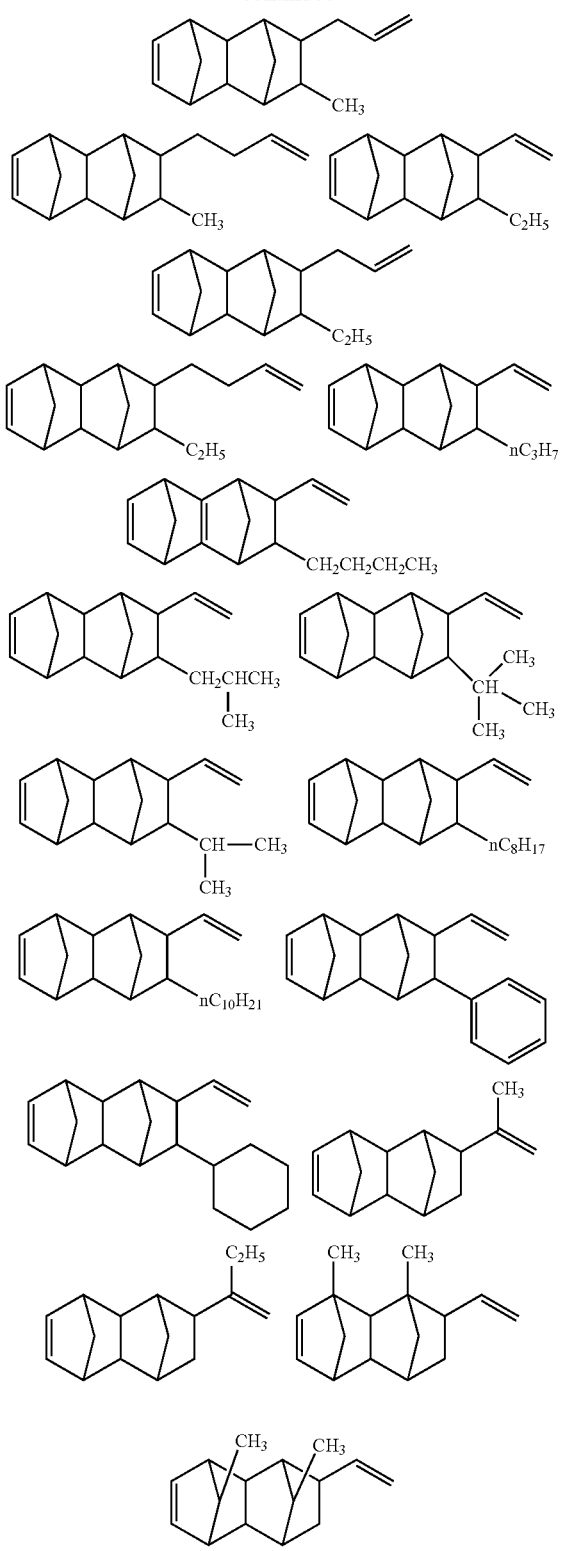

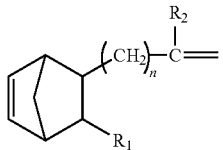

(IIIb)

n in General Formula (IIIb) is an integer of 0 to 10, $R_1$ is a hydrogen atom or an alkyl group having 1 to 10 carbon atoms, and $R_2$ is a hydrogen atom or an alkyl group having 1 to 5 carbon atoms.

The cyclic olefin copolymer (m) of the present embodiment including a constituent unit derived from a cyclic non-conjugated diene represented by General Formula (III) means that the cyclic olefin copolymer (m) has a characteristic of having a double bond in a side chain portion, that is, a portion other than the main copolymerization chain.

The cyclic olefin monomer, which is one of the copolymerization raw materials of the cyclic olefin copolymer (m), is addition copolymerized to form a constituent unit represented by Formula (V). Specifically, a cyclic olefin monomer represented by General Formula (Va) corresponding to General Formula (V) is used.

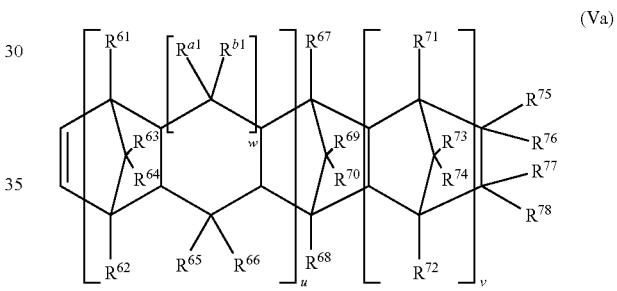

(Va)

In General Formula (Va), u is 0 or 1, v is 0 or a positive integer, preferably an integer of 0 or more to 2 or less, and more preferably 0 or 1, w is 0 or 1, $R^{61}$ to $R^{78}$ and $R^{a1}$ and $R^{b1}$, which may be the same or different, are a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, and $R^{75}$ to $R^{78}$ may bond with each other to form a monocyclic or polycyclic ring.

As specific examples of the cyclic olefin represented by General Formula (Va), it is possible to use the compounds described in International Publication No. 2006/118261. As the cyclic olefin represented by General Formula (Va), bicyclo[2.2.1]-2-heptene (also referred to as norbornene), and tetracyclo[4.4.0.1$^{2,5}$.1$^{7,10}$]-3-dodecene (also referred to as tetracyclododecene) are preferable, and tetracyclo [4.4.0.1$^{2,5}$.1$^{7,10}$]-3-dodecene is more preferable. Since these cyclic olefins have a rigid ring structure, the modulus of elasticity of the copolymer and the cross-linked product is easily retained, and since these cyclic olefins do not include a heterogeneous double bond structure, there is an advantage in that cross-linking can be easily controlled.

Specifically, it is also possible to represent the cyclic non-conjugated diene represented by General Formula (IIIa) by General Formula (IIIb).

By using the olefin monomer represented by General Formula (Ia) and the cyclic olefin represented by General Formula (Va) as the copolymerization component, the solubility of the cyclic olefin copolymer (m) in a solvent is further improved, thus the moldability is good and the yield of the product is improved.

In addition to (A) a repeating unit derived from one or more olefins represented by General Formula (I), (B) a repeating unit derived from cyclic non-conjugated dienes represented by General Formula (III), and (C) a repeating unit derived from one or more cyclic olefins represented by General Formula (V), the cyclic olefin copolymer (m) may be formed by a repeating unit derived from a cyclic olefin other than the cyclic non-conjugated diene represented by General Formula (III) and the cyclic olefins represented by General Formula (V), and/or derived from a chain polyene.

In such a case, in addition to the olefin monomer represented by General Formula (Ia), the cyclic non-conjugated diene monomer represented by General Formula (IIIa), and the cyclic olefin monomer represented by General Formula (Va), as the copolymerization raw materials of the cyclic olefin copolymer (m), it is possible to use cyclic olefin monomers other than the cyclic non-conjugated diene monomer represented by General Formula (IIIa) and the cyclic olefin monomer represented by General Formula (Va), and/or a chain polyene monomer.

Such cyclic olefin monomer and chain polyene monomers are cyclic olefins represented by General Formula (VIa) or (VIIa), or chain polyenes represented by General Formula (VIIIa). Two or more different types of these cyclic olefins and chain polyenes may be used.

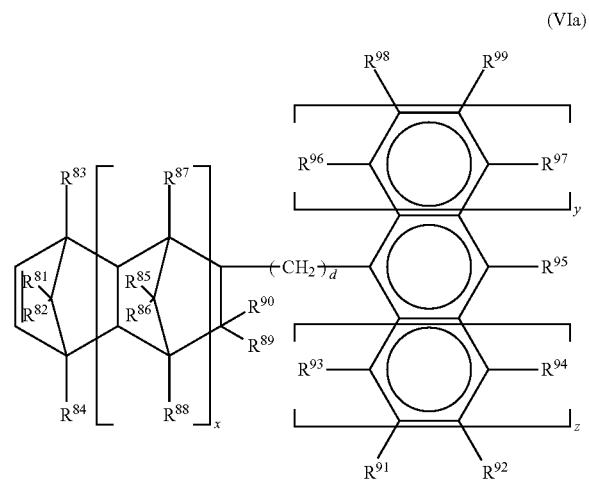

(VIa)

In General Formula (VIa), x and d are 0 or an integer of 1 or more, preferably an integer of 0 to 2, and more preferably 0 or 1, y and z are 0, 1, or 2, $R^{81}$ to $R^{99}$, which may be the same or different from each other, are a hydrogen atom, a halogen atom, an aliphatic hydrocarbon group which is an alkyl group having 1 to 20 carbon atoms or a cycloalkyl group having 3 to 15 carbon atoms, or an aromatic hydrocarbon group or an alkoxy group having 6 to 20 carbon atoms, the carbon atoms to which $R^{89}$ and $R^{90}$ are bonded and the carbon atoms to which $R^{93}$ is bonded or the carbon atom to which $R^{91}$ is bonded may be directly bonded or bonded via an alkylene group having 1 to 3 carbon atoms, and when y=z=0, $R^{95}$ and $R^{92}$ or $R^{95}$ and $R^{99}$ may be bonded to each other to form a monocyclic or polycyclic aromatic ring.

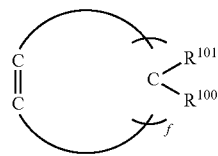

(VIIa)

In General Formula (VIIa), $R^{100}$ and $R^{101}$, which may be the same or different from each other, represent a hydrogen atom or a hydrocarbon group having 1 to 5 carbon atoms, and f is 1≤f≤18.

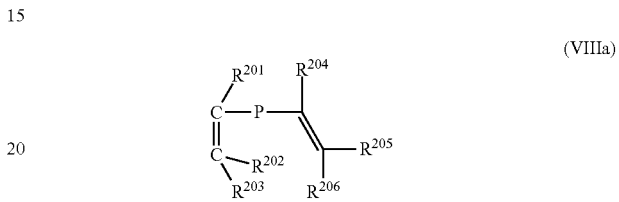

(VIIIa)

In General Formula (VIIIa), $R^{201}$ to $R^{206}$, which may be the same or different, are a hydrogen atom or a hydrocarbon group having 1 to 20 carbon atoms, P is a linear or branched hydrocarbon group having 1 to 20 carbon atoms and may include a double bond and/or a triple bond.

As specific examples of cyclic olefins represented by General Formulas (VIa) and (VIIa), it is possible to use the compounds described in paragraphs 0037 to 0063 of International Publication No. 2006/118261.

Specific examples of the chain polyene represented by General Formula (VIIIa) include 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, DMDT, 1,3-butadiene, 1,5-hexadiene, and the like. In addition, cyclizing polyenes cyclized from polyenes such as 1,3-butadiene and 1,5-hexadiene may also be used.

In a case where the cyclic olefin copolymer (m) includes a constituent unit derived from a chain polyene represented by General Formula (VIIIa), or a constituent unit derived from a cyclic olefin other than the cyclic non-conjugated diene represented by General Formula (III) and the cyclic olefin represented by General Formula (V) (for example, General Formula (VIa) and General Formula (VIIa)), the content of the constituent unit is usually 0.1 to 100 mol %, and preferably 0.1 to 50 mol % with respect to the total molar number of the repeating units derived from one or more olefins represented by General Formula (I), the repeating units derived from one or more cyclic non-conjugated dienes represented by General Formula (III), and the repeating units derived from one or more cyclic olefins represented by General Formula (V).

Using the olefin monomer represented by General Formula (I), the cyclic olefin represented by General Formula (VIa) or (VIIa), and the chain polyene represented by General Formula (VIIIa) as the copolymerization component makes it possible to obtain the effect of the present invention and to further improve the solubility of the cyclic olefin copolymer in the solvent, thus, the moldability is good and the yield of the product is improved. Among these, cyclic olefins represented by General Formula (VIa) or (VIIa) are preferable. Since these cyclic olefins have a rigid ring structure, the modulus of elasticity of the copolymer and the cross-linked product is easily retained, and since these cyclic olefins do not include a heterogeneous double bond structure, there is an advantage in that cross-linking can be easily controlled.

It is possible to control the content of the comonomer and the glass transition point (Tg) of the cyclic olefin copolymer (m) according to the charge ratio of the monomer depending on the desired application. The Tg of the cyclic olefin copolymer (m) is usually 300° C. or less, preferably 250° C. or less, more preferably 200° C. or less, even more preferably 170° C. or less, and particularly preferably 150° C. or less. When the Tg is the above upper limit value or less, the melt moldability of the cyclic olefin copolymer (m) and the solubility in a solvent during varnishing are improved.

The intrinsic viscosity [η] of the cyclic olefin copolymer (m) measured in decalin at 135° C. is usually in the range of 0.10 to 15 dl/g, preferably 0.10 to 5 dl/g, and more preferably 0.15 to 3 dl/g. When the intrinsic viscosity [η] is the above upper limit value or less, the moldability is improved. In addition, when the intrinsic viscosity [η] is the above lower limit or more, the heat resistance and mechanical properties of the cross-linked product (Q) obtained by cross-linking the cyclic olefin copolymer composition are improved.

It is possible to control the intrinsic viscosity [η] of the cyclic olefin copolymer (m) using polymerization conditions such as the polymerization catalyst, co-catalyst, H$_2$ addition amount, polymerization temperature, and the like.

[Method for Producing Cyclic Olefin Copolymer (m)]

It is possible to produce the cyclic olefin copolymer (m) according to the present embodiment, for example, according to the method for producing a cyclic olefin copolymer described in paragraphs 0075 to 0219 of International Publication No. 2012/046443. The details thereof are omitted here.

[Cyclic Olefin Copolymer (n)]

The cyclic olefin copolymer (n) is a cyclic olefin copolymer different from the cyclic olefin copolymer (m). Specifically, the cyclic olefin copolymer (n) includes at least one type selected from a copolymer (n1) of ethylene or an α-olefin and a cyclic olefin and a cyclic olefin ring-opening polymer (n2). Including the cyclic olefin copolymer (n) in the cyclic olefin copolymer composition of the present embodiment makes it possible to further improve the dielectric characteristics of the cross-linked product obtained by cross-linking the cyclic olefin copolymer composition.

Here, the copolymer (n1) does not include the repeating unit derived from the cyclic non-conjugated diene represented by General Formula (III). In the present embodiment, "the copolymer (n1) does not include the repeating unit derived from the cyclic non-conjugated diene represented by General Formula (III)" means that the content of the repeating unit derived from the cyclic non-conjugated diene represented by General Formula (III) is 0.05 mol % or less in a case where the total molar number of the repeating units in the copolymer (n1) is 100 mol %.

As the copolymer (n1) of ethylene or an α-olefin and a cyclic olefin, for example, it is possible to use the polymers described in paragraphs 0030 to 0123 of WO 2008/047468.

For example, the polymer is a polymer having an alicyclic structure in at least a part of the repeating structural unit (also simply referred to below as "polymer having an alicyclic structure") and it is sufficient if the polymer has an alicyclic structure in at least a part of the repeating unit of the polymer, but it is specifically preferable to include a polymer having one or two or more structures represented by General Formula (3).

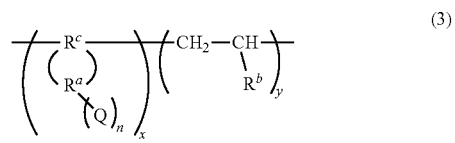

(In Formula (3), x and y represent copolymerization ratios and are real numbers satisfying 0/100≤y/x≤95/5. x and y are on a molar basis.

n represents the number of substituents of the substituent Q and is a real number of 0≤n≤2.

$R^a$ is a 2+n valent group selected from the group consisting of hydrocarbon groups having 2 to 20 carbon atoms.

$R^b$ is a monovalent group selected from the group consisting of a hydrogen atom or a hydrocarbon group having 1 to 10 carbon atoms.

$R^c$ is a tetravalent group selected from the group consisting of hydrocarbon groups having 2 to 10 carbon atoms.

Q is COOR$^d$ (R$^d$ is a monovalent group selected from the group consisting of a hydrogen atom or a hydrocarbon group having 1 to 10 carbon atoms).

Each of $R^a$, $R^b$, $R^c$, and Q may be a single kind or two or more kinds at an arbitrary ratio.)

In General Formula (3), $R^a$ is preferably one or two or more kinds of divalent groups selected from hydrocarbon groups having 2 to 12 carbon atoms, more preferably a divalent group represented by General Formula (7) in a case where n=0, and most preferably a divalent group in which p is 0 or 1 in General Formula (7). The structure of $R^a$ may be a single kind or two or more kinds may be used in combination.

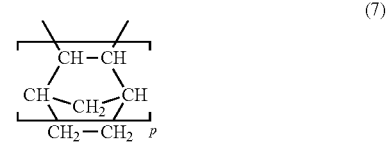

In Formula (7), p is an integer of 0 to 2.

In addition, the copolymer (n1) of ethylene or an α-olefin and a cyclic olefin is a cyclic olefin-based copolymer represented by General Formula (4). For example, the copolymer (n1) is formed of a constituent unit (A) derived from ethylene or a linear or branched α-olefin having 3 to 30 carbon atoms and a constituent unit (B) derived from a cyclic olefin.

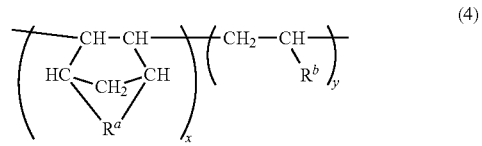

In Formula (4), $R^a$ is a divalent group selected from the group consisting of hydrocarbon groups having 2 to 20 carbon atoms.

$R^b$ is a monovalent group selected from the group consisting of a hydrogen atom or a hydrocarbon group having 1 to 10 carbon atoms.

Each of $R^a$ and $R^b$ may be a single kind or two or more kinds at an arbitrary ratio.

x and y represent copolymerization ratios and are real numbers satisfying 5/95≤y/x≤95/5. Preferably, 50/50≤y/x≤95/5, and more preferably 55/45≤y/x≤80/20. x and y are on a molar basis.

The copolymer (n1) of ethylene or an α-olefin and a cyclic olefin is preferably a copolymer formed of ethylene and a cyclic olefin, and the cyclic olefin is preferably one or more selected from the group consisting of bicyclo[2.2.1]-2-heptene, tetracyclo[4.4.0.1$^{2,5}$.1$^{7,10}$]-3-dodecene, 1,4-methano-1,4,4a,9a-tetrahydrofluorene, a cyclopentadiene-benzine adduct, and a cyclopentadiene-acenaphthylene adduct, and more preferably at least one selected from bicyclo[2.2.1]-2-heptene and tetracyclo[4.4.0.1$^{2,5}$.1$^{7,10}$]-3-dodecene.

The copolymer (n1) of ethylene or an α-olefin and a cyclic olefin may be a polymer having one or two or more structures represented by General Formula (3) or a polymer in which the cyclic olefin-based copolymer represented by General Formula (4) is hydrogenated.

In addition, as the copolymer (n1) of ethylene or an α-olefin and a cyclic olefin, a copolymer of an α-olefin having 4 to 12 carbon atoms and a cyclic olefin is also preferable. As the copolymer of an α-olefin having 4 to 12 carbon atoms and a cyclic olefin, for example, it is possible to use the polymers described in paragraphs 0056 to 0070 of International Publication No. 2015/178145.

Examples of cyclic olefins forming the copolymer of an α-olefin having 4 to 12 carbon atoms and a cyclic olefin include norbornene and substituted norbornene, and norbornene is preferable. These cyclic olefins may be used singly or in a combination of two or more.

The substituted norbornene is not particularly limited, and examples of the substituent of the substituted norbornene include a halogen atom and a monovalent or divalent hydrocarbon group. Specific examples of the substituted norbornene include the example represented by General Formula (A).

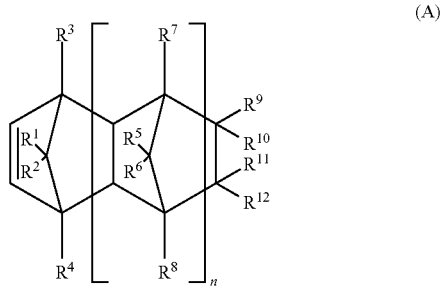

(A)

(In the formula, R$^1$ to R$^{12}$, which may be the same or different, are selected from the group consisting of a hydrogen atom, a halogen atom, and a hydrocarbon group, R$^9$ and R$^{10}$, and R$^{11}$ and R$^{12}$ may be integrated to form a divalent hydrocarbon group, and R$^9$ or R$^{10}$ and R$^{11}$ or R$^{12}$ may form a ring with each other. In addition, n represents 0 or a positive integer, and in a case where n is 2 or more, R$^5$ to R$^8$ may be the same or different from each other in the respective repeating units. However, in a case where n=0, at least one of R$^1$ to R$^4$ and R$^9$ to R$^{12}$ is not a hydrogen atom.)

A description will be given of the substituted norbornene represented by General Formula (A). R$^1$ to R$^{12}$ in General Formula (A), which may be the same or different, are selected from the group consisting of a hydrogen atom, a halogen atom, and a hydrocarbon group.

Specific examples of R$^1$ to R$^8$ include a hydrogen atom; a halogen atom such as fluorine, chlorine, or bromine; an alkyl group having 1 to 20 carbon atoms, and the like, and the above may be different from each other, may be partially different from each other, or may all be the same.

Specific examples of R$^9$ to R$^{12}$ include a hydrogen atom; a halogen atom such as fluorine, chlorine, or bromine; an alkyl group having 1 to 20 carbon atoms; a cycloalkyl group such as a cyclohexyl group; a substituted or unsubstituted aromatic hydrocarbon group such as a phenyl group, a tolyl group, an ethylphenyl group, an isopropylphenyl group, a naphthyl group, or an anthryl group; an aralkyl group in which an aryl group is substituted for a benzyl group, a phenethyl group, or another alkyl group; or the like, and the above may be different from each other, may be partially different from each other, or may all be the same.

Specific examples in a case where R$^9$ and R$^{10}$ or R$^{11}$ and R$^{12}$ are integrated to form a divalent hydrocarbon group include alkylidene groups such as an ethylidene group, a propylidene group, an isopropylidene group, and the like.

In a case where R$^9$ or R$^{10}$ and R$^{11}$ or R$^{12}$ form a ring with each other, the formed ring may be monocyclic or polycyclic, may be a polycyclic ring having cross-linking, may be a ring having a double bond, or may be a ring formed of a combination of these rings. In addition, these rings may have a substituent such as a methyl group.

Specific examples of the substituted norbornene represented by General Formula (A) include cyclic olefins with two rings such as 5-methyl-bicyclo[2.2.1]hept-2-ene, 5,5-dimethyl-bicyclo[2.2.1]hept-2-ene, 5-ethyl-bicyclo[2.2.1]hept-2-ene, 5-butyl-bicyclo[2.2.1]hept-2-ene, 5-ethylidene-bicyclo[2.2.1]hept-2-ene, 5-hexyl-bicyclo[2.2.1]hept-2-ene, 5-octyl-bicyclo[2.2.1]hept-2-ene, 5-octadecyl-bicyclo[2.2.1]hept-2-ene, 5-methylidene-bicyclo[2.2.1]hept-2-ene, 5-vinyl-bicyclo[2.2.1]hept-2-ene, and 5-propenyl-bicyclo[2.2.1]hept-2-ene; tricyclo[4.3.0.1$^{2,5}$]deca-3,7-diene (common name: dicyclopentadiene), tricyclo[4.3.0.1$^{2,5}$]dec-3-ene; tricyclo[4.4.0.1$^{2,5}$]undeca-3,7-diene, tricyclo[4.4.0.1$^{2,5}$]undeca-3,8-diene, or tricyclo[4.4.0.1$^{2,5}$]undeca-3-ene, or partial hydrogenated products thereof (or an adduct of cyclopentadiene and cyclohexene); cyclic olefins with three rings such as 5-cyclopentyl-bicyclo[2.2.1]hept-2-ene, 5-cyclohexyl-bicyclo[2.2.1]hept-2-ene, 5-cyclohexenylbicyclo[2.2.1]hept-2-ene, and 5-phenyl-bicyclo[2.2.1]hept-2-ene; cyclic olefins with four rings such as tetracyclo[4.4.0.1$^{2,5}$.1$^{7,10}$]dodeca-3-ene (also simply referred to as tetracyclododecene), 8-methyltetracyclo[4.4.0.1$^{2,5}$.1$^{7,10}$]dodeca-3-ene, 8-ethyltetracyclo[4.4.0.1$^{2,5}$.1$^{7,10}$]dodeca-3-ene, 8-methylidenetetracyclo[4.4.0.1$^{2,5}$.1$^{7,10}$]dodeca-3-ene, 8-ethylidenetetracyclo[4.4.0.1$^{2,5}$.1$^{7,10}$]dodeca-3-ene, 8-vinyltetracyclo[4.4.0.1$^{2,5}$.1$^{7,10}$]dodeca-3-ene, and 8-propenyl-tetracyclo[4.4.0.1$^{2,5}$.1$^{7,10}$]dodeca-3-ene; 8-cyclopentyl-tetracyclo[4.4.0.1$^{2,5}$.1$^{7,10}$]dodeca-3-ene, 8-cyclohexyl-tetracyclo[4.4.0.1$^{2,5}$.1$^{7,10}$]dodeca-3-ene, 8-cyclohexenyl-tetracyclo[4.4.0.1$^{2,5}$.1$^{7,10}$]dodeca-3-ene, and 8-phenyl-cyclopentyl-tetracyclo[4.4.0.1$^{2,5}$.1$^{7,10}$]dodeca-3-ene; tetracyclo[7.4.1$^{3,6}$.0$^{1,9}$.0$^{2,7}$]tetradeca-4,9,11,13-tetraene (also referred to as 1,4-methano-1,4,4a,9a-tetrahydrofluorene), tetracyclo[8.4.1$^{4,7}$.0$^{1,10}$.0$^{3,8}$]pentadeca-5,10,12,14-tetraene (also referred to as 1,4-methano-1,4,4a,5,10,10a-hexahydroanthracene); pentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-4-pentadecene, pentacyclo[7.4.0.0$^{2,7}$.1$^{3,6}$.1$^{10,13}$]-4-pentadecene; heptacyclo[8.7.0.1$^{2,9}$.1$^{4,7}$.1$^{4,7}$.0$^{3,8}$.0$^{12,16}$]-5-eicosene, heptacyclo[8.7.0.1$^{2,9}$.0$^{3,8}$.1$^{4,7}$.0$^{12,17}$.1$^{3,16}$]-14-eicosene; and polycyclic cyclic olefins such as tetramers of cyclopentadiene.

Among the above, alkyl-substituted norbornenes (for example, bicyclo[2.2.1]hepta-2-ene substituted with one or more alkyl groups) and alkylidene-substituted norbornenes (for example, bicyclo[2.2.1]hept-2-ene substituted with one or more alkylidene groups) are preferable, 5-ethylidene-bicyclo[2.2.1]hepta-2-ene (common name: 5-ethylidene-2-norbornene or simply ethylidene norbornene) are particularly preferable.

Examples of the α-olefin having 4 to 12 carbon atoms of the copolymer of an α-olefin having 4 to 12 carbon atoms and a cyclic olefin include α-olefins having 4 to 12 carbon atoms, and α-olefins having 4 to 12 carbon atoms and having at least one type of substituent such as a halogen atom, and α-olefins having 4 to 12 carbon atoms are preferable.

The α-olefin having 4 to 12 carbon atoms is not particularly limited, and examples thereof include 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, and the like. Among these, 1-hexene, 1-octene, and 1-decene are preferable.

In the copolymer of an α-olefin having 4 to 12 carbon atoms and a cyclic olefin according to the present embodiment, when the total of the repeating units included in the copolymer is 100 mol %, the ratio of the repeating unit derived from an α-olefin having 4 to 12 carbon atoms is preferably 10 mol % or more to 90 mol % or less, more preferably 15 mol % or more to 80 mol % or less, and even more preferably 20 mol % or more to 70 mol % or less.

In addition, in the copolymer of the α-olefin having 4 to 12 carbon atoms and the cyclic olefin according to the present embodiment, when the total of the repeating units included in the copolymer is 100 mol %, the ratio of the repeating unit derived from the cyclic olefin is preferably 10 mol % or more to 90 mol % or less, more preferably 20 mol % or more to 85 mol % or less, and even more preferably 30 mol % or more to 80 mol % or less.

The conditions of the polymerization step for obtaining a copolymer of an α-olefin having 4 to 12 carbon atoms and a cyclic olefin are not particularly limited as long as the desired copolymer is obtained, and it is possible to use known conditions and the polymerization temperature, polymerization pressure, polymerization time, and the like are appropriately adjusted.

In addition, as the cyclic olefin copolymer (n), it is possible to use the cyclic olefin ring-opening polymer (n2).

Examples of the cyclic olefin ring-opening polymer (n2) include a ring-opening polymer of a norbornene-based monomer and a ring-opening polymer of a norbornene-based monomer and another monomer capable of ring-opening copolymerization with the norbornene-based monomer, hydrogenated products thereof, and the like.

As the norbornene-based monomer, for example, bicyclo[2.2.1]hept-2-ene (common name: norbornene) and derivatives thereof (those having substituents on the ring), tricyclo[4.3.01,6.12,5]deca-3,7-diene (common name: dicyclopentadiene) and derivatives thereof, 7,8-benzotricyclo[4.3.0.1$^{2,5}$]deca-3-ene (common name: methanotetrahydrofluorene, also referred to as 1,4-methano-1,4,4a,9a-tetrahydrofluorene) and derivatives thereof, tetracyclo[4.4.0.1$^{2,5}$.1$^{7,10}$]-3-dodecene (common name: tetracyclododecene) and derivatives thereof, and the like.

Examples of the substituents substituted on the rings of these derivatives include an alkyl group, an alkylene group, a vinyl group, an alkoxycarbonyl group, an alkylidene group, and the like. Here, it is possible for the substituent to have 1 or 2 or more substituents. Examples of such derivatives having a substituent on the ring include 8-methoxycarbonyl-tetracyclo[4.4.0.1$^{2,5}$.1$^{7,10}$]dodeca-3-ene, 8-methyl-8-methoxycarbonyl-tetracyclo[4.4.0.1$^{2,5}$.1$^{7,10}$]dodeca-3-ene, 8-ethylidene-tetracyclo[4.4.0.1$^{2,5}$.1$^{7,10}$]dodeca-3-ene, and the like.

These norbornene-based monomers are each used singly or in a combination of two or more kinds.

It is possible to obtain a ring-opening polymer of a norbornene-based monomer or a ring-opening polymer of a norbornene-based monomer and another monomer capable of ring-opening copolymerization with the norbornene-based monomer by subjecting the monomer component to polymerization in the presence of a known ring-opening polymerization catalyst.

As the ring-opening polymerization catalyst, for example, it is possible to use a catalyst formed of a halide of a metal such as ruthenium or osmium, a nitrate or acetylacetone compound, and a reducing agent; a catalyst formed of a halide of a metal such as titanium, zirconium, tungsten, or molybdenum, or an acetylacetone compound, and an organoaluminum compound; and the like.

Examples of other monomers capable of ring-opening copolymerization with the norbornene-based monomer include monocyclic cyclic olefin-based monomers such as cyclohexene, cycloheptene, cyclooctene, and the like.

Usually, it is possible to obtain a hydrogenated product of a ring-opening polymer of a norbornene-based monomer or a hydrogenated product of a ring-opening polymer of a norbornene-based monomer and another ring-opening monomer capable of copolymerization with the norbornene monomer by adding a known hydrogenation catalyst including a transition metal such as nickel or palladium to the polymerization solution of a ring-opening polymer described above and hydrogenating the carbon-carbon unsaturated bond.

In the present embodiment, one kind of cyclic olefin copolymer (n) may be used alone, or two or more kinds thereof may be used in combination.

[Elastomer]

The cyclic olefin copolymer composition of the present embodiment may further include an elastomer from the viewpoint of improving the dielectric characteristics in a high frequency band while improving the mechanical properties of the obtained cross-linked product.

From the viewpoint of further improving the dielectric characteristics in the high frequency band while improving the mechanical properties of the obtained cross-linked product when the entirety of the cyclic olefin copolymer composition is 100 parts by mass, the content of the elastomer is preferably 1 part by mass or more to 50 parts by mass or less.

As the elastomer, for example, it is preferable to include one or two or more kinds selected from a styrene-based elastomer, an ethylene/propylene elastomer, and a diene-based elastomer.

Examples of the styrene-based elastomer include styrene-conjugated diene block copolymer resin (conjugated dienes including butadiene, isoprene, and the like), hydrogenated products of styrene-conjugated diene block copolymer resin (conjugated dienes including butadiene, isoprene, and the like), triblock copolymer resin of styrene-conjugated diene-styrene (conjugated dienes including butadiene, isoprene, and the like), hydrogenated products of triblock copolymer resins of styrene-conjugated diene styrene (conjugated dienes including butadiene, isoprene, and the like), and the like.

Examples of the ethylene/propylene elastomer include ethylene/propylene rubber, ethylene/propylene-diene rubber, and the like.

Examples of the diene-based elastomers include polybutadiene, polyisoprene, styrene-butadiene rubber, butadiene rubber, isoprene rubber, chloroprene rubber, acrylonitrile-butadiene rubber, and the like.

[Additives]

Various additives may be added to the cyclic olefin copolymer composition of the present embodiment according to the purpose. The amount of the additive to be added is appropriately selected within a range which does not impair the object of the present invention depending on the application.

Examples of the additives include one kind or two or more kinds of additives selected from the group consisting of heat resistant stabilizers, weathering stabilizers, radiation resistant agents, plasticizers, lubricants, releasing agents, nucleating agents, frictional abrasion-improving agents, flame retardants, foaming agents, antistatic agents, coloring agents, anti-fogging agents, anti-blocking agents, impact resistance agents, surface wetting improvers, fillers, hydrochloric acid absorbers, and metal deactivators.

Examples of heat resistant stabilizers include phosphite-based heat resistant stabilizers such as tris(2,4-di-tert-butylphenyl)phosphite, bis[2,4-bis(1,1-dimethylethyl)-6-methylphenyl]ethyl ester phosphorous acid, tetrakis(2,4-di-tert-butylphenyl) [1,1-biphenyl]-4,4'-diyl bisphosphonite, and bis(2,4-di-tert-butylphenyl)pentaerythritol diphosphite; lactone-based heat resistant stabilizers such as reaction products of 3-hydroxy-5,7-di-tert-butyl-furan-2-one and o-xylene; hindered phenol-based heat resistant stabilizers such as 3,3',3'',5,5',5''-hexa-tert-butyl-a,a',a''-(methylene-2,4,6-tryl) tri-p-cresol, 1,3,5-trimethyl-2,4,6-tris(3,5-di-tert-butyl-4-hydroxyphenyl)benzylbenzene, pentaerythritol tetrakis[3-(3,5-di-tert-butyl-4-hydroxyphenyl)propionate], octadecyl-3-(3,5-di-tert-butyl-4-hydroxyphenyl)propionate, and thiodiethylenebis[3-(3,5-di-tert-butyl-4-hydroxyphenyl) propionate]; sulfur-based heat resistant stabilizers, amine-based heat resistant stabilizers, and the like. In addition, it is also possible to use these singly or in a combination of two or more. Among these, phosphite-based heat resistant stabilizers and hindered phenol-based heat resistant stabilizers are preferable.

As the weathering stabilizer, it is possible to use one or two or more compounds selected from light stabilizers, antioxidants, ultraviolet absorbers, and the like.

Examples of the light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, N-(2,2,6,6-tetramethyl-4-piperidyl)dodecylsuccinimide, 1-[(3,5-di-tert-butyl-4-hydroxyphenyl)propionyloxyethyl]-2,2,6,6-tetramethyl-4-piperidyl-(3,5-di-tert-butyl-4-hydroxyphenyl)propionate, bis(1,2,2,6,6-pentamethyl-4-piperidyl)sebacate, bis(1,2,2,6,6-pentamethyl-4-piperidyl)-2-butyl-2-(3,5-di-tert-butyl-4-hydroxybenzyl)malonate, N,N'-bis(2,2,6,6-tetramethyl-4-piperidyl)hexamethylenediamine, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)di(tridecyl)-1,2,3,4-butanetetracarboxylate, bis(1,2,2,6,6-pentamethyl-4-piperidyl)di(tridecyl)-1,2,3,4-butanetetracarboxylate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane, 1,5,8,12-tetrakis[4,6-bis{N-(2,2,6,6-tetramethyl-4-piperidyl)butylamino}-1,3,5-triazin-2-yl]-1,5,8,12-tetraazadodecane, 1-(2-hydroxyethyl)-2,2,6,6-tetramethyl-4-piperidinol/dimethylsuccinate condensate, 2-tert-octylamino-4,6-dichloro-s-triazine/N,N'-bis(2,2,6,6-tetramethyl-4-piperidyl)hexamethylenediamine condensate, N,N'-bis(2,2,6,6-tetramethyl-4-piperidyl)hexamethylenediamine/dibromoethane condensate, 2,2,6,6-tetramethyl-4-hydroxypiperidine-N-oxyl, bis(2,2,6,6-tetramethyl-N-oxylpiperidine) sebacate, tetrakis(2,2,6,6-tetramethyl-N-oxypiperidyl)butane-1,2,3,4-tetracarboxylate, 3,9-bis(1,1-dimethyl-2-(tris(2,2,6,6-tetramethyl-N-oxylpiperidyl-4-oxycarbonyl)butylcarbonyloxy)ethyl)2,4,6,10-tetraoxaspiro [5.5]undecane, 1,6-bis(2,2,6,6-tetramethyl-4-piperidylamino)hexane/dibromoethane polycondensate, 1,6-bis(2,2,6,6-tetramethyl-4-piperidylamino) hexane/2,4-dichloro-6-tertiary octylamino-s-triazine polycondensate, 1,6-bis(2,2,6,6-tetramethyl-4-piperidylamino) hexane/2,4-dichloro-6-morpholino-s-triazine polycondensate, a condensate of 2,2,6,6-tetramethyl-4-piperidinol, tridecyl alcohol, and 1,2,3,4-butanetetracarboxylic acid, a condensate of 2,2,6,6-tetramethyl-4-piperidinol and 1,2,3,4-butanetetracarboxylic acid, a condensate of 1,2,2,6,6-pentamethyl-4-piperidinol, tridecyl alcohol, and 1,2,3,4-butanetetracarboxylic acid, a condensate of 1,2,2,6,6-pentamethyl-4-piperidinol and 1,2,3,4-butanetetracarboxylic acid, 1-[2-[3-(3,5-di-t-butyl-4-hydroxyphenyl)propionyloxy]ethyl]-4-[3-3,5-di-t-butyl-4-hydroxyphenyl]propionyloxy]-2,2,6,6-tetramethyipiperidine (for example, Sanol LS-2626, manufactured by Sankyosha Co., Ltd.), 2-(3,5-di-t-butyl-4-hydroxybenzyl)-2-n-butylmalonic acid bis-(1,2,2,6,6-pentamethyl-4-piperidyl) (for example, Tinuvin 144, manufactured by BASF), bis(2,2',6,6'-tetramethyl-4-piperidyl)sebacate (for example, Tinuvin 770, manufactured by BASF), poly[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imino] (for example, CHIMASSORB 944, manufactured by BASF), and the like.

Examples of the antioxidant include a phenol-based antioxidant, a phosphorus-based antioxidant, a sulfur-based antioxidant, a thioether-based antioxidant, and the like.

Examples of phenol-based antioxidants include the acrylate-based phenol compounds described in Japanese Unexamined Patent Publication No. 63-179953 and Japanese Unexamined Patent Publication No. 1-168643 such as 2-t-butyl-6-(3-t-butyl-2-hydroxy-5-methylbenzyl)-4-methylphenylacrylate, 2,4-di-t-amyl-6-(1-(3,5-di-t-amyl-2-hydroxyphenyl)ethyl)phenylacrylate; alkyl-substituted phenol-based compounds such as 2,6-di-t-butyl-4-methylphenol, 2,6-di-t-butyl-4-ethylphenol, octadecyl-3-(3,5-di-t-butyl-4-hydroxyphenyl)propionate, 2,2'-methylene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-t-butyl-4'-hydroxyphenylpropionate) methane [that is, pentaerythritol-methyl-tetrakis(3-(3,5-di-t-butyl-4-hydroxyphenyipropionate)], triethylene glycol bis(3-(3-t-butyl-4-hydroxy-5-methylphenyl)propionate), and tocopherol; triazine group-containing phenol-based compounds such as 6-(4-hydroxy-3,5-di-t-butylanilino)-2,4-bisoctylthio-1,3,5-triazine, 6-(4-hydroxy-3,5-dimethylanilino)-2,4-bisoctylthio-1,3,5-triazine, 6-(4-hydroxy-3-methyl-5-t-butylanilino)-2,4-bisoctylthio-1,3,5-triazine, and 2-octylthio-4,6-bis-(3,5-di-t-butyl-4-oxyanilino)-1,3,5-triazine; and the like. Among these, acrylate-based phenol compounds and alkyl substituted phenol-based compounds are preferable, and alkyl substituted phenol-based compounds are particularly preferable.

Examples of the phosphorus-based antioxidants include monophosphite-based compounds such as triphenyl phosphite, diphenylisodecylphosphite, phenyl diisodecyl phosphite, tris(nonylphenyl)phosphite, tris(dinonylphenyl)phosphite, tris(2,4-di-t-butylphenyl)phosphite, tris(2-t-butyl-4-methylphenyl)phosphite, tris(cyclohexylphenyl)phosphite, 2,2-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-desiloxy-9,10-dihydro-9-oxa-10-phosphaphenanthrene; diphosphate-based compounds such as 4,4'-butylidene-bis(3-methyl-6-t-butyl-phenyl-di-tridecylphosphite), 4,4'-isopropylidene-bis(phenyl-di-alkyl (C12-C15) phosphite), 4,4'-isopropylidene-bis (diphenyl monoalkyl (C12-C15) phosphite), 1,1,3-tris(2-methyl-4-di-tridecylphosphite-5-t-butylphenyl)butane, tetrakis(2,4-di-t-butylphenyl)-4,4'-biphenylene diphosphite, cyclic neopentane tetrayl bis(isodecyl phosphite), cyclic neopentane tetrayl bis(nonylphenyl phosphite), cyclic neopentane tetrayl bis(2,4-di-t-butylphenyl phosphite), cyclic neopentane tetrayl bis(2,4-dimethyl phenyl phosphite), and cyclic neopentane tetrayl bis(2,6-di-t-butyl phenyl phosphite). Among these, monophosphate-based compounds are preferable, and tris(nonylphenyl)phosphite, tris(dinonylphenyl)phosphite, tris(2,4-di-t-butylphenyl)phosphite, and the like are particularly preferable.

Examples of sulfur-based antioxidants include dilauryl 3,3-thiodipropionate, dimyristyl 3,3'-thiodipropionate, distearyl 3,3-thiodipropionate, lauryl stearyl 3,3-thiodipropionate, pentaerythritol-tetrakis-(R-lauryl-thio-propionate), 3,9-bis(2-dodecylthioethyl)-2,4,8,10-tetraoxaspiro[5,5]undecane, and the like.

Examples of thioether-based antioxidants include tetrakis{methylene-3-(laurylthio)propionate}methane, bis[methyl-4-{3-n-alkyl (C12 or C14) thiopropionyloxy}-5-t-butylphenyl]sulfide, ditridecyl-3,3'-thiodipropionate, and the like.

Examples of ultraviolet absorbers include benzophenone-based ultraviolet absorbers, salicylic acid-based ultraviolet absorbers, benzotriazole-based ultraviolet absorbers, acrylate-based ultraviolet absorbers, metal complex salt-based ultraviolet absorbers, and the like.

Examples of benzophenone-based ultraviolet absorbers include 2,4-dihydroxybenzophenone, 2-hydroxy-4-methoxybenzophenone, 2-hydroxy-4-methoxybenzophenone-5-sulfonic acid trihydrate, 2-hydroxy-4-octyloxybenzophenone, 4-dodecaloxy-2-hydroxybenzophenone, 4-benzyloxy-2-hydroxybenzophenone, 2,2',4,4'-tetrahydroxybenzophenone, 2,2'-dihydroxy-4,4'-dimethoxybenzophenone, and the like.

Examples of salicylic acid-based ultraviolet absorbers include phenyl salicylate, 4-t-butylphenyl-2-hydroxybenzoate, phenyl-2-hydroxybenzoate, 2,4-di-t-butylphenyl-3,5-di-t-butyl-4-hydroxybenzoate, hexadecyl-3,5-di-t-butyl-4-hydroxybenzoate, and the like.

Examples of benzotriazole-based ultraviolet absorbers include 2-(2-hydroxy-5-methylphenyl)2H-benzotriazole, 2-(3-t-butyl-2-hydroxy-5-methylphenyl)-5-chloro-2H-benzotriazole, 2-(3,5-di-t-butyl-2-hydroxyphenyl)-5-chloro-2H-benzotriazole, 2-(3,5-di-t-butyl-2-hydroxyphenyl)-2H-benzotriazole, 5-chloro-2-(3,5-di-t-butyl-2-hydroxyphenyl)-2H-benzotriazole, 2-(3,5-di-t-amyl-2-hydroxyphenyl)-2H-benzotriazole, 2-(2-hydroxy-5-t-octylphenyl)-2H-benzotriazole, 2-(2-hydroxy-4-octylphenyl)-2H-benzotriazole, 2-(2H-benzotriazol-2-yl)-4-methyl-6-(3,4,5,6-tetrahydrophthalimidylmethyl)phenol, 2,2'-methylenebis[4-(1,1,3,3-tetramethylbutyl)-6-[(2H-benzotriazol-2-yl) phenol]], and the like.

Examples of acrylate-based ultraviolet absorbers include ethyl-2-cyano-3,3-diphenylacrylate, 2'-ethylhexyl-2-cyano-3,3-diphenylacrylate, and the like.

As the metal complex salt-based ultraviolet absorber, a complex salt of nickel or cobalt is usually used. Specifically, nickel[2,2'thiobis(4-t-octyl)phenolate] n-butylamine, nickel dibutyl dithiocarbamate, nickel bis[o-ethyl-3,5-(di-t-butyl-4-hydroxybenzyl)]phosphate, cobalt dicyclohexyl dithiophosphate, [1-phenyl, 3-methyl, 4-decanoyl, pyrazolate(5) 2]nickel, and the like.

Examples of radiation resistant agents include rosin, rosin derivatives (for example, modified rosins such as hydrogenated rosin, disproportionated rosin, and polymerized rosin, and modified rosin esters thereof), terpene resin, terpene phenol resin, aromatic modified terpene resins, hydrogenated terpene resins, aliphatic petroleum resins, aromatic petroleum resins, copolymerizable petroleum resins, alicyclic petroleum resins, hydrogenated petroleum resins, alkylphenol resins, and the like.

Examples of plasticizers include phosphate triester plasticizers such as tricresyl phosphate, trixylyl phosphate, triphenyl phosphate, triethyl phenyl phosphate, diphenyl cresyl phosphate, monophenyl dicresyl phosphate, dicresyl monooxy silanyl phosphate, arylalkyl phosphate, diphenylmonoxylenylphosphate, morphosphate, trioctylphosphate, and tris(isopropylphenyl)phosphate; phthalic acid ester plasticizers such as dimethyl phthalate, diethyl phthalate, dibutyl phthalate, diheptyl phthalate, di-n-octyl phthalate, di-2-ethylhexyl phthalate, diisononyl phthalate, octyldecyl phthalate, and butyl benzyl phthalate; fatty acid monobasic acid ester-based plasticizers such as butyl oleate and glycerin monooleic acid ester; dibutyl adipate, adipic acid di-n-fatty acid dibasic acid ester-based plasticizers; divalent alcohol ester-based plasticizers; oxyacid ester-based plasticizers, and the like.

Examples of lubricants include higher fatty acids such as waxes, oils, capric acids, lauric acid, myristic acid, palmitic acid, margaric acid, stearic acid, arachidic acid, behenic acid or metal salts thereof, that is, lithium salt, calcium salt, sodium salt, magnesium salt, potassium salt, and the like, aliphatic alcohols such as palmityl alcohol, cetyl alcohol, and stearyl alcohol, aliphatic amides such as caproic acid amide, caprylic acid amide, capric acid amide, lauric acid amide, myristic acid amide, palmitin acid amide, and stearic acid amide, esters of fatty acids and alcohols, fluoroalkyl carboxylic acids or metal salts thereof, fluorine compounds such as fluoroalkyl sulfonic acid metal salts, and the like.

Examples of waxes include mineral waxes such as montan wax, peat wax, ozokerite ceresin wax, and petroleum wax, polyolefin waxes such as polyethylene wax and polypropylene wax, synthetic waxes such as Fischer-Tropsch wax, chemically modified hydrocarbon wax, substituted amide wax, plant wax, and animal wax, and the like.

Examples of oils include natural and synthetic oils such as aromatic oils, naphthenic oils, mineral oils such as paraffin-based oils, vegetable oils, and silicone oils. As the silicone oil, it is possible to use dimethylpolysiloxane having a viscosity of 10 to 5000 cSt, preferably 500 cSt.

Examples of releasing agents include a lower (C1-4) alcohol ester of a higher fatty acid (such as butyl stearate), a polyhydric alcohol ester of a fatty acid (C4-30) (hardened castor oil, or the like), a glycol ester of a fatty acid, liquid paraffin, and the like.

Examples of nucleating agents include metal salts of benzoic acid such as sodium 2,2'-methylenebis(4,6-di-t-butylphenyl)phosphate, [phosphoric acid-2,2'-methylenebis (4,6-di-t-butylphenyl)]dihydroxy aluminum, bis[phosphoric acid-2,2'-methylenebis(4,6-di-t-butylphenyl)]hydroxy aluminum, tris[phosphoric acid-2,2'-methylenebis(4,6-di-t-butylphenyl)]aluminum, sodium bis(4-t-butylphenyl)phosphate, and sodium benzoate, aluminum p-t-butylbenzoate, 1,3:2,4-bis(O-benzylidene) sorbitol, 1,3:2,4-bis(O-methylbenzylidene) sorbitol, 1,3:2,4-bis(O-ethylbenzylidene) sorbitol, 1,3-O-3,4-dimethylbenzylidene-2,4-O-benzylidene sorbitol, 1,3-O-benzylidene-2,4-O-3,4-dimethylbenzylidene sorbitol, 1,3:2,4-bis(O-3,4-dimethylbenzylidene) sorbitol, 1,3-O-p-chlorobenzylidene-2,4-O-3,4-dimethylbenzylidenesorbitol, 1,3-O-3,4-dimethylbenzylidene-2,4-O-p-chlorobenzylidene sorbitol, 1,3:2,4-bis(O-p-chlorobenzylidene) sorbitol, mixtures thereof, and the like.

Examples of the frictional abrasion-improving agents include resin fillers such as ultrahigh molecular weight polyethylene fillers, PTFE fillers, and polyimide fillers, and inorganic fillers such as boron nitride fillers and aluminum nitride fillers, and the like.

As the flame retardant, for example, it is possible to use halogen-based flame retardants, phosphorus-based flame retardants, nitrogen-including flame retardants, and antimony-based flame retardants.

As the halogen-based flame retardant, it is possible to use various chlorine-based and bromine-based flame retardants, but in terms of the flame retardant effect, heat resistance during molding, dispersibility in resin, influence on the physical properties of resin, and the like, it is preferable to use bromine-based flame retardants such as pentabromodiphenyl ether, octabromodiphenyl ether, decabromodiphenyl ether, tetrabromobisphenol A, hexabromocyclododecane, hexabromobenzene, pentabromoethylbenzene, hexabromobiphenyl, decabromobiphenyl, hexabromodiphenyl oxide, octabromodiphenyl oxide, decabromodiphenyl oxide, pentabromocyclohexane, tetrabromobisphenol A, and derivatives thereof [for example, tetrabromobisphenol A-bis(hydroxyethyl ether), tetrabromobisphenol A-bis(2,3-dibromopropyl ether), tetrabromobisphenol A-bis(bromoethyl ether), tetrabromobisphenol A-bis(allyl ether), and the like], tetrabromobisphenol S and derivatives thereof [for example, tetrabromobisphenol S-bis(hydroxyethyl ether), tetrabromobisphenol S-bis(2,3-dibromopropyl ether), and the like], tetrabromophthalic anhydride, and derivatives thereof [for example, tetrabromophthalimide, ethylene bistetrabromophthalimide, and the like], ethylenebis(5,6-dibromonorbornene-2,3-dicarboximide), tris-(2,3-dibromopropyl-1)-isocyanurate, Diels-Alder reaction adducts of hexachlorocyclopentadiene, tribromophenyl glycidyl ether, tribromophenyl acrylate, ethylene bistribromophenyl ether, ethylene bispentabromophenyl ether, tetradecabromodiphenoxybenzene, bromine-based polystyrene, bromine-based polyphenylene oxide, bromine-based epoxy resin, bromine-based polycarbonate, polypentabromo benzyl acrylate, octabromonaphthalene, hexabromocyclododecane, bis(tribromophenyl)fumaramide, N-methylhexabromodiphenylamine; or chlorine-based flame retardants such as chlorinated paraffin.

Examples of the phosphorus-based flame retardant include halogen-based phosphoric acid ester flame retardants such as tris(chloroethyl)phosphate, tris(2,3-dichloropropyl)phosphate, tris(2-chloropropyl)phosphate, tris(2,3-bromopropyl)phosphate, trisbromochloropropyl)phosphate, 2,3-dibromopropyl-2,3-chloropropyl phosphate, tris(tribromophenyl)phosphate, tris(dibromophenyl)phosphate, and tris(tribromoneopentyl)phosphate; aliphatic phosphate esters such as trimethyl phosphate, triethyl phosphate, tributyl phosphate, trioctyl phosphate, and tributoxyethyl phosphate; non-halogen-based phosphate ester flame retardants such as aromatic phosphate esters such as triphenyl phosphate, cresyl diphenylphosphate, dicresyl phenylphosphate, tricresyl phosphate, trixylenyl phosphate, xylenyl diphenylphosphate, tri(isopropylphenyl)phosphate, isopropylphenyl diphenyl phosphate, diisopropylphenyl phenyl phosphate, tri(trimethylphenyl)phosphate, tri(t-butylphenyl)phosphate, hydroxyphenyl diphenyl phosphate, and octyl diphenyl phosphate; aluminum phosphinate-based flame retardants such as aluminum dimethyl phosphinate and aluminum diethyl phosphinate, and the like.

Examples of the nitrogen-including flame retardant include melamine cyanurate, isocyanuric acid, tris(2-hydroxyethyl)isocyanurate, triallyl isocyanurate, tris(2,3-epoxypropyl)isocyanurate, guanidine hydrochloride, guanidine nitrate, guanidine phosphate, guanidine sulfate, guanidine sulfamate, guanidine tetraborate, guanidine carbonate, guanyl urea phosphate, guanyl urea sulfate, melamine, melamine-melam-melem, melamine cyanurate, melamine phosphate, melamine pyrophosphate, melamine polyphosphate, polyline acid melamine-melam-melem, melamine sulfate, and the like.

Examples of the antimony-based flame retardant include antimony oxide, antimony trioxide, antimony pentoxide, antimony tetraoxide, sodium antimonate, and the like.

As the foaming agent, it is possible to broadly use foaming agents generally used for the foam molding of rubber, specifically, inorganic foaming agents such as sodium bicarbonate, sodium carbonate, ammonium bicarbonate, ammonium carbonate, and ammonium nitrite, nitroso compounds such as N,N'-dimethyl-N,N'-dinitrosoterephthalamide and N,N'-dinitrosopentamethylenetetramine, azo compounds such as azodicarbonamide, azobisisobutyronitrile, azocyclohexyl nitrile, azodiaminobenzene, and barium azodicarboxylate, sulfonyl hydrazide compounds such as benzenesulfonylhydrazide, toluenesulfonylhydrazide, p,p'-oxybis(benzenesulfonylhydrazide), and diphenylsulfone-3,3'-disulfonylhydrazide, and azide compounds such as calcium azide, 4,4-diphenyl disulfonyl azide, and p-toluenesulfonyl azide.

Examples of antistatic agents and anti-fogging agents include cationic surfactants, anionic surfactants, amphoteric surfactants, nonionic surfactants, and the like.

Examples of the cationic surfactants include tetraalkylammonium salts such as lauryltrimethylammonium chloride and stearyltrimethylammonium chloride.

Examples of the anionic surfactants include alkyl sulfonates such as sodium decane sulfonate, sodium undecane sulfonate, sodium dodecane sulfonate, sodium tridecane sulfonate, sodium tetradecane sulfonate, sodium pentadecane sulfonate, sodium hexadecane sulfonate, sodium heptadecane sulfonate, sodium octadecane sulfonate, sodium nonadecane sulfonate, sodium eicosane sulfonate, potassium decane sulfonate, potassium undecane sulfonate, potassium dodecane sulfonate, potassium tridecane sulfonate, potassium tetradecane sulfonate, potassium pentadecane sulfonate, potassium hexadecane sulfonate, potassium heptadecane sulfonate, potassium octadecane sulfonate, potassium nonadecane sulfonate, and potassium eicosane sulfonate, alkyl benzene sulfonates such as sodium decyl benzene sulfonate, sodium undecyl benzene sulfonate, sodium dodecyl benzene sulfonate, sodium tridecyl benzene sulfonate, sodium tetradecyl benzenesulfonate, sodium pentadecyl benzenesulfonate, sodium hexadecyl benzenesulfonate, sodium heptadecyl benzenesulfonate, and sodium octadecyl benzenesulfonate, alkyl phosphates, and the like.

Examples of amphoteric surfactants include betaine compounds such as lauryl betaine, stearyl betaine, lauryl amidopropyl betaine, and stearyl amidopropyl betaine, dimethylamine oxide compounds such as lauryl dimethyl amine oxide and stearyl dimethyl amine oxide, alanine compounds such as N-stearyl-α-alaninate and N-lauryl-α-alaninate, and the like.

Examples of nonionic surfactants include lauric acid monoglyceride, palmitic acid monoglyceride, stearic acid monoglyceride, oleic acid monoglyceride, behenic acid monoglyceride, caprylic acid monoglyceride, coconut fatty acid monoglyceride, lauric acid diglyceride, palmitic acid diglyceride, stearic acid diglyceride, oleic acid diglyceride, behenic acid diglyceride, caprylic acid diglyceride, coconut fatty acid diglyceride, lauric acid triglyceride, palmitic acid triglyceride, stearic acid triglyceride, oleic acid triglyceride, behenic acid triglyceride, caprylic acid triglyceride, and coconut fatty acid triglyceride, fatty acid esters of pentaerythritol such as pentaerythritol monolaurate, pentaerythritol monostearate, pentaerythritol dilaurate, pentaerythritol distearate, pentaerythritol tristearate, pentaerythritol tetrastearate, and pentaerythritol tetralaurate, fatty acid esters of sorbitol such as sorbitol monolaurate, and sorbitol monostearate, fatty acid esters of polyhydric alcohols such as polyethylene glycol fatty acid esters such as polyethylene glycol monolaurate, polyethylene glycol monostearate, polyethylene glycol monooleate, and polyethylene glycol distearate, diethanol amides such as lauric acid diethanolamide, stearic acid diethanol amide, coconut fatty acid diethanolamide, and the like.

As the coloring agent, for example, it is possible to arbitrarily use various types of natural and synthetic dyes, and various inorganic and organic pigments.

Examples of the anti-blocking agent include particulate inorganic compounds such as silica, alumina, alumina silicate, and diatomaceous earth, fine particulate organic compounds such as polyethylene, cross-linked polyethylene, polymethyl methacrylate, cross-linked polymethyl methacrylate, and the like.

As the impact resistance agent, for example, it is possible to use various agents such as (meth)acrylate ester-based impact resistance agents having a core/shell type structure.

Examples of surface wetting improvers include silane coupling agents such as vinyltrimethoxysilane, 3-glycidoxypropyltrimethoxysilane, 3-methacryloxypropyltrimethoxysilane, 3-aminopropyltrimethoxysilane, and the like.

Examples of fillers include inorganic fillers, organic fillers, and the like.

Examples of inorganic fillers include silica, diatomaceous earth, alumina, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite, talc, clay, mica, asbestos, calcium silicate, montmorillonite, bentonite, graphite, aluminum powder, molybdenum sulfide, and the like. These may be used singly or in a combination of two or more.

Examples of organic fillers include starch and derivatives thereof, cellulose and derivatives thereof, pulp and derivatives thereof, paper and derivatives thereof, wheat flour, bean curd refuse, bran, coconut shells, coffee ground, protein, phthalic acid-based, aliphatic polybasic acid-based, glycerin-based, citric acid-based, glycol-based, or olefin-based low molecular weight material, polyethylene terephthalate fibers, polyethylene naphthalate fibers, aramid fibers, and the like.

Examples of hydrochloric acid absorbers include higher fatty acid metal salts. Specific examples thereof include sodium stearate, magnesium stearate, calcium stearate, zinc stearate, lithium stearate, barium stearate, aluminum stearate, sodium 12-hydroxystearate, calcium 12-hydroxystearate, magnesium 12-hydroxystearate, zinc 12-hydroxystearate, and the like. In addition, examples thereof include epoxy-based compounds such as epoxidized octyl stearate and epoxidized soybean oil; inorganic compounds such as magnesium hydroxide, calcium hydroxide, hydrotalcite, and the like.

Examples of metal deactivators include N,N'-diphenyloxamide, N-salicylal-N'-salicyloylhydrazine, N,N'-bis(salicyloyl)hydrazine, N,N'-bis(3,5-di-t-butyl-4-hydroxyphenylpropionyl)hydrazine, 3 salicyloylamino-1,2,4-triazole, bis(benzylidene) oxalyl dihydrazide, oxanilide, isophthaloyl dihydrazide, sebacoyl bisphenylhydrazide, N,N'-bis(salicyloyl)oxalyl dihydrazide, N,N'-bis(salicyloyl)thiopropionyl dihydrazide, and the like.

[Method for Preparing Cyclic Olefin Copolymer Composition]

In the method of preparing the cyclic olefin copolymer composition of the present embodiment, it is possible to carry out the preparation by mixing the cyclic olefin copolymer (m), the cyclic olefin copolymer (n), the elastomer as necessary, and various additives. As the mixing method, it is possible to adopt a method of melt blending in an extruder or the like, a solution blending method in which dissolution and dispersion are performed in a suitable solvent, for example, a saturated hydrocarbon such as heptane, hexane, decane, or cyclohexane, an aromatic hydrocarbon such as toluene, benzene, or xylene, or the like.

[Varnish]

It is possible to make varnish by mixing the cyclic olefin copolymer composition of the present embodiment with a solvent.

The solvent for preparing the varnish is not particularly limited as long as solubility or affinity is not impaired with respect to the cyclic olefin copolymer (m) and the cyclic olefin copolymer (n). As preferably used solvents, saturated hydrocarbons such as heptane, hexane, octane, and decane; alicyclic hydrocarbons such as cyclohexane, methylcyclohexane, and decahydronaphthalene; aromatic hydrocarbons such as toluene, benzene, xylene, mesitylene, and pseudocumene; alcohols such as methanol, ethanol, isopropyl alcohol, butanol, pentanol, hexanol, propanediol, and phenol; ketone solvents such as acetone, methyl isobutyl ketone, methyl ethyl ketone, pentanone, hexanone, cyclohexanone, isophorone, and acetophenone; cellosolves such as methyl cellosolve and ethyl cellosolve; esters such as methyl acetate, ethyl acetate, butyl acetate, methyl propionate, and butyl formate; and halogenated hydrocarbons such as trichloroethylene, dichloroethylene, and chlorobenzene are used. Preferably, heptane, decane, cyclohexane, methylcyclohexane, decahydronaphthalene, toluene, benzene, xylene, mesitylene, and pseudocumene are used. It is possible to use these solvents alone or in a mixture of two or more kinds at any ratio.

In the present embodiment, the method for preparing the varnish may carry out the preparation by any method, but usually includes a step of mixing the cyclic olefin copolymer composition and the solvent. The order of the components in the mixing of the respective components is not limited and the mixing is able to be carried out by any method such as in batches or separately. The apparatus for preparing the varnish is not limited and the preparation may be carried out by any batch type or continuous type apparatus capable of stirring and mixing. It is possible to arbitrarily select the temperature for preparing the varnish within a range from room temperature to the boiling point of the solvent.

The varnish may be prepared by directly using the reaction solution obtained when the cyclic olefin copolymer (m) is obtained as a solvent and dissolving the cyclic olefin copolymer (n) therein. In addition, the varnish may be prepared by mixing the varnish of the separately prepared cyclic olefin copolymer (n) with the reaction solution when the cyclic olefin copolymer (m) is obtained.

[Production Method of Cross-Linked Product (Q)]

The cross-linked product (Q) is a cross-linked product of the cyclic olefin copolymer composition of the present embodiment and is obtained by cross-linking the cyclic olefin copolymer (m) in the cyclic olefin copolymer composition described above. The method for cross-linking the cyclic olefin copolymer (m) is not particularly limited, but examples thereof include a method of cross-linking while molding or after molding into an arbitrary shape using a radical polymerization initiator, sulfur, a hydrosilyl group-containing compound, or electron beams or other radiation.

When cross-linking with a radical polymerization initiator, it is possible to directly apply a cross-linking method using a normal radical polymerization initiator applied using a polyolefin. That is, a radical polymerization initiator such as dicumyl peroxide is blended into the cyclic olefin copolymer composition, heated, and subjected to cross-linking. The blending ratio of the radical polymerization initiator is not particularly limited, but is usually 0.02 to 20 parts by mass per 100 parts by mass of the cyclic olefin copolymer (m), preferably 0.05 to 10 parts by mass, and even more preferably 0.5 to 10 parts by mass. When the blending ratio of the radical polymerization initiator is the above upper limit value or less, it is possible to improve the dielectric characteristics of the cross-linked product (Q), and when the above lower limit value or more, it is possible to improve the heat resistance and mechanical properties of the cross-linked product (Q).

As the radical polymerization initiator, it is possible to use known thermal radical polymerization initiators or photo radical polymerization initiators, or combinations thereof. Among these radical polymerization initiators, in a case where a thermal radical polymerization initiator is used, the 10-hour half-life temperature is usually 80° C. or higher, and preferably 120° C. or higher from the viewpoint of storage stability. Examples of such initiators include dialkyl peroxides such as dicumyl peroxide, t-butyl cumyl peroxide, 2,5-bis(t-butylperoxy) 2,5-dimethylhexane, 2,5-bis(t-butylperoxy) 2,5-dimethyl hexyne-3, di-t-butyl peroxide, isopropyl cumyl-t-butyl peroxide, and bis(α-t-butylperoxy isopropyl)benzene; peroxy ketals such as 1,1-bis(t-butylperoxy) cyclohexane, 1,1-bis(t-butylperoxy) 3,3,5-trimethylcyclohexane, 1,1-bis(t-butylperoxy) cyclododecane, n-butyl-4,4-bis(t-butylperoxy) valerate, ethyl 3,3-bis(t-butylperoxy) butyrate, 3,3,6,6,9,9-hexamethyl-1,2,4,5-tetraoxycyclononane; peroxy esters such as bis(t-butylperoxy) isophthalate, t-butylperoxybenzoate, and t-butylperoxyacetate; hydroperoxides such as t-butylhydro peroxide, t-hexyl hydroperoxide, cumyl hydroperoxide, 1,1, 3,3-tetramethylbutyl hydroperoxide, diisopropylbenzene hydroperoxide, and p-menthane hydroperoxide; bibenzyl compounds such as 2,3-dimethyl-2,3-diphenylbutane; 3,3,5, 7,7-pentamethyl-1,2,4-trioxepane, and the like.

Specific examples of photoradical polymerization initiators in the radical polymerization initiators include benzoin alkyl ether, benzyl dimethyl ketal, 1-hydroxycyclohexyl phenyl ketone, 2-hydroxy-2-methyl-1-phenylpropane-1-on, benzophenone, methylbenzoylformate, isopropylthioxanthone, mixtures of two or more kinds thereof, and the like. In addition, it is also possible to use sensitizers together with these photoradical polymerization initiators. Examples of sensitizers include carbonyl compounds such as anthraquinone, 1,2-naphthoquinone, 1,4-naphthoquinone, benzanthrone, p,p'-tetramethyldiaminobenzophenone, and chloranil, nitro compounds such as nitrobenzene, p-dinitrobenzene, and 2-nitrofluorene, aromatic hydrocarbons such as anthracene and chrysene, sulfur compounds such as diphenyldisulfide, nitrogen compounds such as nitroaniline, 2-chloro-4-nitroaniline, 5-nitro-2-aminotoluene, and tetracyanoethylene, and the like.

In a case of cross-linking with sulfur or the like, the cyclic olefin copolymer composition is blended with a sulfur-based compound, and, as necessary, a vulcanization accelerator and a vulcanization acceleration aid, and heated to perform a cross-linking reaction. Although the blending amount of the sulfur-based compound is not particularly limited, in terms of efficiently advancing the cross-linking reaction, improving the physical properties of the obtained cross-linked product, economy and the like, the sulfur-based compound is usually used in a range of 0.1 to 10 parts by mass with respect to 100 parts by mass of the cyclic olefin copolymer (m) and preferably in the range of 0.3 to 5 parts by mass, and in a case of being used together with a vulcanization accelerator or a vulcanization acceleration aid, usually in a range of 0.1 to 20 parts by mass and preferably 0.2 to 10 parts by mass.

It is possible to use various known sulfur compounds to cause the cross-linking reaction, and examples thereof include sulfur, sulfur monochloride, sulfur dichloride, morpholine disulfide, alkylphenol disulfide, tetramethylthiuram disulfide, selenium dimethyldithiocarbamate, and the like. In addition, it is possible to use various types of vulcanization accelerators and examples thereof include thiazole-based kinds such as N-cyclohexyl-2-benzothiazole-sulfenamide, N-oxydiethylene-2-benzothiazole-sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole, and benzothiazyl-disulfide; guanidine-based kinds such as diphenyl guanidine, triphenyl guanidine, di-ortho-tolyl guanidine, orthosol lilbiguanide, and diphenyl guanidine phthalate; acetaldehyde-aniline reaction product; butyraldehyde-aniline condensate; aldehyde amine or aldehyde ammonia-based kinds such as hexamethylenetetramine and acetoaldehyde ammonia; imidazoline-based kinds such as 2-mercaptoimidazoline; thio-urea-based kinds such as thiocarbanilide, diethyl thiourea, dibutyl thiourea, trimethyl thiourea, and diorthosolyl thiourea; thiuram-based kinds such as tetramethyl thiuram monosulfide, tetramethylthiuram disulfide, tetraethylthiuram disulfide, tetrabutylthiuram disulfide, and dipentamethylenethiuram tetrasulfide; dithio acid salt-based kinds such as zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, and tellurium diethyldithiocarbamate; xanthate-based kinds such as zinc dibutyl xanthate; and the like. Examples of vulcanization acceleration aids include metal oxide-based kinds such as zinc oxide, activated zinc oxide, zinc carbonate, complex zinc oxide, magnesium oxide, litharge, red lead, and basic lead carbonate, fatty acid-based kinds such as stearic acid, oleic acid, lauric acid, and lead stearate, organic amine glycol-based kinds such as triethanol amine, and diethylene glycol, and the like.

The temperature at which the cyclic olefin copolymer composition is cross-linked by both radical polymerization initiator cross-linking and sulfur cross-linking is usually 100 to 300° C., preferably 120 to 250° C., and more preferably 120 to 220° C., and the cross-linking may be carried out by changing the temperature in stages. When the temperature is the above lower limit value or more, it is possible for the cross-linking to proceed sufficiently. In addition, when the temperature is the above upper limit value or less, it is possible to suppress coloration of the obtained cross-linked product and to simplify the process. As a reference, it is generally not possible for polybutadiene, which is a typical double bond-including polymer, to be cross-linked under the conditions as described above and cross-linking conditions at high temperature such as 300° C. are necessary.

It is also possible for the cyclic olefin copolymer composition of the present embodiment to be cross-linked using a hydrosilyl group-containing compound having at least two hydrosilyl groups in one molecule. It is possible to carry out cross-linking using a hydrosilyl group-containing compound, for example, according to the method described in JP-A-2015-193680. Details are omitted here.

Methods of cross-linking using electron beams or other radiation have the advantage of not limiting the temperature and fluidity at the time of molding, and examples of radiation include electron beams, gamma rays, UV, and the like.

In either case of a method using a radical polymerization initiator, sulfur, a hydrosilyl group-including compound, or the like, or a method of cross-linking using radiation, it is possible to carry out the cross-linking with a cross-linking aid.

The cross-linking aid is not particularly limited and examples thereof include oximes such as p-quinonedioxime and p,p'-dibenzoylquinonedioxime; acrylates or methacrylates such as ethylene dimethacrylate, polyethylene glycol dimethacrylate, trimethylolpropane trimethacrylate, cyclohexyl methacrylate, acrylic acid/zinc oxide mixture, and allyl methacrylate; vinyl monomers such as divinylbenzene, vinyltoluene, and vinylpyridine; allyl compounds such as hexamethylene diallyl nadimide, diallyl itaconate, diallyl phthalate, diallyl isophthalate, diallyl monoglycidyl isocyanurate, triallyl cyanurate, and triallyl isocyanurate; maleimide compounds such as N,N'-m-phenylene bismaleimide and N,N'-(4,4'-methylene diphenylene)dimaleimide, cyclic non-conjugated dienes such as vinyl norbornene, ethylidene norbornene, and dicyclopentadiene. These cross-linking aids may be used alone or use in combination is also possible.

It is also possible for the cross-linking reaction to be carried out on a mixture of the cyclic olefin copolymer composition and a compound such as the above radical polymerization initiator, sulfur, hydrosilyl group-containing compound or the like in a molten state, it is also possible for the cross-linking reaction to be carried out on the mixture in a dissolved state of being dissolved or dispersed in a solvent, or it is also possible for the cross-linking reaction to be further advanced after volatilizing the solvent from a dissolved state dissolved in a solvent to mold an arbitrary shape such as a film or a coating.

In a case where the reaction is carried out in the molten state, the raw material mixture is melt-kneaded and reacted using a kneading apparatus such as a mixing roll, a Banbury mixer, an extruder, a kneader, a continuous mixer, or the like. In addition, it is also possible to further advance the cross-linking reaction after molding by an arbitrary method.

As a solvent to be used for carrying out the reaction in a dissolved state, it is possible to use the same solvent as used in the solution blending method.

In a case where the cross-linking reaction is carried out using electron beams, other radiation, or UV, it is possible for the reaction to be carried out after shaping by an arbitrary method.

[Film or Sheet]

It is possible for the cross-linked product of the cyclic olefin copolymer composition of the present embodiment to be formed into a film or sheet and used for various purposes. As a method of forming a film or a sheet using the cyclic olefin copolymer composition of the present embodiment, it is possible to apply various known methods. Examples thereof include a method in which the varnish described above is coated on a support substrate such as a thermoplastic resin film, dried, and then subjected to a heat treatment or the like to cross-link the cyclic olefin copolymer composition. The method of coating the varnish on the support substrate is not particularly limited, but examples thereof include coating using a spin coater, coating using a spray coater, coating using a bar coater, and the like.

In addition, examples thereof also include a method of melt-molding the cyclic olefin copolymer composition of the present embodiment to obtain a film or sheet.

[Laminate]

It is possible to use the film or sheet of the present embodiment for various purposes as a laminate by laminating the film or sheet on a substrate. As a method for forming the laminate of the present embodiment, it is possible to apply various known methods.

For example, it is possible to produce a laminate by laminating a film or sheet produced by the method described above on a substrate and carrying out heating and curing by pressing or the like as necessary.

In addition, it is also possible to produce a laminate by laminating an electrically insulating layer including the cross-linked product described above on a conductor layer.

[Multi-Layer Formed Article or Multi-Layer Laminated Film]

The cyclic olefin copolymer composition of the present embodiment may be formed on the surface layers of various multi-layer formed articles or multi-layer laminate films. At this time, the resin layer formed from the cyclic olefin copolymer composition is preferably 100 μm or less.

Examples of the various multi-layer formed articles or multi-layer laminated films include multi-layer formed articles for optical lenses in which the cyclic olefin copolymer composition of the present embodiment is formed on the surface of a resin optical lens, multi-layer gas barrier films in which the cyclic olefin copolymer composition of the present embodiment is formed for imparting gas barrier properties to a resin film surface such as a PET film or a PE film.

[Prepreg]

In addition, the prepreg of the present embodiment is formed by combining the cyclic olefin copolymer composition of the present embodiment and the sheet-like fiber substrate.

The method for producing the prepreg is not particularly limited and it is possible to apply various known methods. Examples thereof include a method including a step of impregnating the varnish described above into a sheet-like fiber substrate to obtain an impregnated body and a step of heating the obtained impregnated body and drying the solvent included in the varnish.

It is possible to carry out the impregnation of the varnish into the sheet-like fiber substrate, for example, by coating a predetermined amount of varnish on the sheet-like fiber substrate by a known method such as spray coating, dip coating, roll coating, curtain coating, die coating, and slit coating, overlaying a protective film thereon as necessary, and carrying out pressing with a roller or the like thereon from the upper side.

In addition, the step of heating the impregnated body and drying the solvent included in the varnish described above is not particularly limited and examples thereof include a method such as batchwise drying in air or nitrogen with an air dryer or drying by heating in a heating furnace in a subsequent step.

In the present embodiment, after the varnish is impregnated into the sheet-like fiber substrate, the obtained impregnated body is heated to a predetermined temperature to evaporate the solvent included in the varnish to obtain a prepreg.

As the fibers of the sheet-like fiber substrate according to the present embodiment, it is possible to use inorganic and/or organic fibers without particular limitation and examples thereof include organic fiber such as polyethylene terephthalate (PET) fibers, aramid fibers, ultra-high molecular polyethylene fibers, polyamide (nylon) fibers, and liquid crystal polyester fibers; inorganic fibers such as glass fibers, carbon fibers, alumina fibers, tungsten fibers, molybdenum fibers, titanium fibers, steel fibers, boron fibers, silicon carbide fibers, and silica fibers; and the like. Among these, organic fibers and glass fibers are preferable, and aramid fibers, liquid crystal polyester fibers, and glass fibers are particularly preferable. Examples of glass fibers include E glass, NE glass, S glass, D glass, H glass, T glass, and the like.

Impregnation of the varnish into the sheet-like fiber substrate is carried out, for example, by immersion and coating. The impregnation may be repeated a plurality of times as necessary.

These sheet-like fiber substrates are able to be used singly or in a combination of two or more and the usage amount of the sheet-like fiber substrate is appropriately selected according to demands, but is usually in a range of 10 to 90% by mass in the prepreg or laminate, preferably 20 to 80% by mass, and more preferably 30 to 70% by mass. Within this range, the dielectric characteristics and the mechanical strength of the obtained laminate are highly balanced, which is preferable.

The thickness of the prepreg according to the present embodiment is appropriately selected according to the purpose of use, but is usually 0.001 to 10 mm, preferably 0.005 to 1 mm, and more preferably 0.01 to 0.5 mm. Within this range, the shaping properties at the time of lamination and the characteristics such as mechanical strength and toughness of the laminate obtained by curing are sufficiently exhibited, which is preferable.

[Circuit Substrate]

As described above, the cyclic olefin copolymer composition of the present embodiment is excellent in dielectric characteristics, heat resistance, mechanical properties and the like, and is thus able to be suitably used for a circuit substrate.

It is possible to adopt generally known methods as a method for producing the circuit substrate without particular limitation, for example, a film, a sheet, or a prepreg produced by the method described above is heated and cured by a lamination press or the like to form an electrically insulating layer. Next, conductor layers are laminated on the obtained electrically insulating layer by a known method to produce a laminate. Thereafter, it is possible to obtain a circuit substrate by circuit processing the conductor layer in the laminate or the like.

It is possible to use metals such as copper, aluminum, nickel, gold, silver, stainless steel, or the like as the metal for the conductor layer. Examples of the method for forming the conductor layer include a method in which the metal is formed into a foil or the like and thermally fused onto the electrically insulating layer, a method in which a metal is formed into a foil or the like and bonded to the electrically insulating layer using an adhesive, a method of forming a conductor layer formed of the metal on an electrically insulating layer by a method such as sputtering, vapor deposition, or plating, and the like. As the form of the circuit substrate, either a single-sided board or a double-sided board may be used.

It is possible to use such a circuit substrate as an electronic device, for example, by mounting electronic parts such as semiconductor elements thereon. It is possible to produce electronic devices based on known information.

Examples of such electronic devices include ICT infrastructure equipment such as servers, routers, supercomputers, mainframes, and workstations; antennas such as GPS antennas, antennas for radio base stations, millimeter wave antennas, and RFID antennas; communication devices such as mobile phones, smartphones, PHSs, PDAs, and tablet terminals; digital devices such as personal computers, televisions, digital cameras, digital video cameras, POS terminals, wearable terminals, and digital media players; vehicle-mounted electronic devices such as electronic control system devices, vehicle-mounted communication devices, car navigation devices, millimeter wave radars, and in-vehicle camera modules; semiconductor testing devices, high-frequency measurement devices; and the like.

[Foamed Product]

In addition, it is possible to obtain a foamed product by cross-linking and foaming the cyclic olefin copolymer composition of the present embodiment. At this time, the foaming agent described above may be added to the cyclic olefin copolymer composition.

[Uses]

Since the cyclic olefin copolymer composition and the cross-linked product (Q) of the present invention are excellent in solvent resistance, heat resistance, mechanical strength, and transparency, the formed article formed of the cross-linked product is able to be used for applications such as electronic elements such as optical fibers, optical waveguides, optical disc substrates, optical filters, lenses, optical adhesives, PDP optical filters, coating materials for organic EL, base film substrates for solar cells in the aerospace field, coating materials for solar cells and thermal control systems, semiconductor elements, light emitting diodes, and various types of memory, a prepreg or a laminate used for forming an insulating layer of a hybrid IC, an MCM, a circuit substrate, or an insulating layer of a circuit substrate, overcoat materials or an interlayer insulating materials for display components or the like, substrates for liquid crystal displays or solar cells, medical instruments, members for automobiles, releasing agents, resin modifiers, transparent substrates for displays, members for lithium-ion batteries, semiconductor process members, film capacitors, gas barrier coating materials, electric wire coating materials, automobile members, aerospace members, process material for semiconductors, wire coating materials, members for lithium ion batteries, members for fuel cells, capacitor films, flexible display members, anchor coat materials, transparent adhesives, modifiers, cross-linking aids, medical containers, medical catheter members, waterproof sealing materials, releasing materials, hard coat materials, and foam modifiers.

In particular, since the present invention is excellent in the stability over time of the dielectric property and is also excellent in solvent resistance, heat resistance, transparency, mechanical properties, and the like, it is possible to suitably use the present invention for high frequency applications such as high frequency circuit substrates. Furthermore, since the present invention is excellent in the gas barrier property, it is possible to suitably use the present invention as a substrate, film, or sheet of a liquid crystal display or solar cell.

Although the embodiments of the present invention are described above, these are examples of the present invention, and it is also possible to adopt various configurations other than those described above.

In addition, the present invention is not limited to the above-described embodiments, and variations, improvements, and the like within the scope of achieving the object of the present invention are included in the present invention.

EXAMPLES

A more detailed description will be given below of the present invention with reference to Synthesis Examples and Examples, but the present invention is not limited in any way thereby.

The composition and intrinsic viscosity [η] of the cyclic olefin copolymer (m) used in the Synthesis Examples, the Examples, and the Comparative Example were measured by the methods described below.

Composition: The $^1$H-NMR measurement was carried out to calculate the cyclic non-conjugated diene content from the strength of the peaks derived from hydrogen directly bonded to the double bond carbon and the other hydrogen peaks.

Intrinsic viscosity [η]; measured in decalin at 135° C.

The films obtained in the Examples and Comparative Examples were evaluated by the following method.

Evaluation of Dielectric Tangent: The dielectric tangent was evaluated for the films obtained in Examples and Comparative Examples. Evaluation is based on JIS K6911, the precision LCR meter HP 4284 A (manufactured by Agilent Technologies Co., Ltd.) was the test apparatus, the shape of the test piece was 50 mm×50 mm, the main electrode (φ 18 mm), the guard electrode (φ 26 mm), and the counter electrode (φ 28 mm) were formed in the test piece from a conductive paste, and measurement was carried out in a test environment of 22° C.×60% RH and a measurement frequency of 1 MHz. A dielectric tangent of 0.001 or more was rated as B, and less than 0.001 was evaluated as A.

Evaluation of dielectric tangent: For the laminates obtained in Examples and Comparative Examples, a dielectric tangent at 12 GHz was evaluated by a cylindrical cavity resonator method using a network analyzer (8510 B manufactured by YHP Co.). A dielectric tangent of 0.002 or more was rated as B, and less than 0.002 was evaluated as A.

Storage elastic modulus E': For the films and laminates obtained in Examples and Comparative Examples, the dynamic viscoelasticity was measured under nitrogen using RSA-III manufactured by TA Instruments. Here, the storage elastic modulus (E') and the loss elastic modulus (E") are terms for the complex elastic modulus representing the relationship between the stress and the strain at the time of imparting a sinusoidal vibrational strain to the viscoelastic body and are values measured at a temperature increase rate of 3° C./min and a frequency of 1 Hz by RSA-III manufactured by TA Instruments using the tension mode or three point bending mode (Auto tension, Auto strain control).

A: Storage elastic modulus (E') at 300° C. is 1 MPa or more

B: Storage elastic modulus (E') at 300° C. is less than 1 MPa

The following raw materials were used for the experiment.

Transition metal compound (1) (synthesized by the method described in JP-A-2004-331965.)

Transition metal compound (1)

Transition metal compound (2): CpTiCl$_2$ (N=C'Bu$_2$) synthesized by the method described in J. Am. Chem. Soc. 2000, 122, 5499-5509.

MMAO (manufactured by Tosoh Finechem Corp.)

Toluene (manufactured by Wako Pure Chemical Industries, Ltd.: Wako Special grade)

Xylene (manufactured by Wako Pure Chemical Industries, Ltd.: Wako Special grade)

5-vinyl-2-norbornene (manufactured by Tokyo Chemical Industry Co., Ltd.)

Tetracyclo[4.4.0.1$^{2,5}$.1$^{7,10}$]-3-dodecene (manufactured by Mitsui Chemicals, Inc.)

Acetone (manufactured by Wako Pure Chemical Industries, Ltd.: Wako Special grade)

Methanol (manufactured by Wako Pure Chemical Industries, Ltd.: Wako Special Grade)

Cyclic Olefin Copolymer (n):

Polymer 1: copolymer formed of ethylene and tetracyclo [4.4.0.1$^{2,5}$.1$^{7,10}$]-3-dodecene (product name: Apel 6509T, manufactured by Mitsui Chemicals, Inc.)

Polymer 2: copolymer formed of ethylene and tetracyclo [4.4.0.1$^{2,5}$.1$^{7,10}$]-3-dodecene (product name: Apel 6015T, manufactured by Mitsui Chemicals, Inc.)

Polymer 3: copolymer formed of ethylene and bicyclo [2.2.1]2-heptene (product name: TOPAS 6013, manufactured by Polyplastics Co., Ltd.)

Polymer 4: cyclic olefin ring-opening polymer (product name: ZEONEX E48R, manufactured by Zeon Corp.)

Polymer 5: copolymer formed of 1-decene and norbornene (synthesized according to Synthesis Example 2 below)

Polymer 6: copolymer formed of 1-hexene and tetracyclo [4.4.0.1$^{2,5}$.1$^{7,10}$]-3-dodecene (synthesized according to Synthesis Example 3 below.)

Elastomers

Elastomer 1: Ethylene/propylene diene rubber (product name: Mitsui EPT 8030M, manufactured by Mitsui Chemicals, Inc.)

Elastomer 2: Ethylene/propylene diene rubber (product name: liquid EPT PX-062, manufactured by Mitsui Chemicals, Inc.)

Elastomer 3: Ethylene/propylene diene rubber (product name: Trilene 65, manufactured by Lion Chemicals)

Elastomer 4: Polybutadiene (product name: B-3000, manufactured by Nippon Soda Co., Ltd.)

Elastomer 5: Styrene/butadiene block copolymer resin (product name: Tufprene 126 S, manufactured by Asahi Kasei Corp.)

Weathering Stabilizers:

Weathering stabilizer 1: Chimassorb 944 (manufactured by BASF)

Weathering stabilizer 2: Irganox 1010 (manufactured by BASF)

Weathering stabilizer 3: Sumilizer GA 80 (manufactured by Sumitomo Chemical Co., Ltd.)

Weathering stabilizer 4: Irgafos 168 (manufactured by BASF)

Radical Polymerization Initiator:

Cross-linking agent 1: Percumyl D (manufactured by NOF Corp.)

Cross-linking agent 2: Perbutyl P (manufactured by NOF Corp.)

Cross-linking agent 3: Perhexyn 25 B (manufactured by NOF Corp.)

Flame Retardants:

Flame retardant 1: Aluminum diethylphosphinate (Exolit OP 935, manufactured by Clariant)

Flame retardant 2: Melamine cyanurate (MC-6000 manufactured by Nissan Chemical Industries, Ltd.)

Flame retardant 3: Bromine-based flame retardant (Saytex BT 93 W)

Flame retardant 4: SbO$_3$ (manufactured by Nippon Seiko Co., Ltd., Patox-MF)

Fillers:

Filler 1: Crushed silica (manufactured by Tatsumori Ltd., AS-1)

Glass cloth: Glass cloth 1: 1031 NT S640 (manufactured by Arisawa Manufacturing Co., Ltd.)

Copper Foil:

Copper foil 1: F1-WS (manufactured by Furukawa Electric Co., Ltd.)

Synthesis Example 1

1670 ml of xylene, 212 ml of 5-vinyl-2-norbornene (VNB), and 120 ml of tetracyclo[4.4.0.1$^{2,5}$.1$^{7,10}$] 3-dodecene (TD), 4 mmol in terms of Al of a toluene solution of MMAO (manufactured by Tosoh Finechem Corp.), and 1984 ml of hydrogen were placed in an autoclave made of SUS having an internal volume of 4 L and sufficiently substituted with nitrogen, then ethylene was introduced into the system until the total pressure was 0.6 MPa. 0.04 mmol of the transition metal compound (1) was dissolved in 10 ml of toluene and polymerization was initiated. While continuously supplying ethylene gas and maintaining the pressure therein, polymerization was carried out at 25° C. for 60 minutes, then the polymerization was stopped by adding 5 ml of methanol. After completion of the polymerization, the reaction product was placed into a mixed solvent of 15 L of acetone and 5 L of methanol to which 20 ml of concentrated hydrochloric acid was added to precipitate the whole amount of the polymer, which was stirred and filtered with a filter paper. This operation was repeated until the reaction product was gone, and all of the obtained polymer was dried under reduced pressure at 80° C. for 10 hours to obtain 261 g of an ethylene/TD/VNB copolymer. The intrinsic viscosity [r] was 0.40 (dL/g), the composition ratio of the structure derived from VNB in the polymer determined by NMR was 25.7 mol %, and the composition ratio of the structure derived from TD was 10.6 mol %. The glass transition temperature measured by DSC was 101° C.

Synthesis Example 2

1000 mL of cyclohexane, 50 g of norbornene, and 50 g of 1-decene were charged into a glass autoclave having an internal volume of 2 L and sufficiently substituted with nitrogen, and the gas phase portion was saturated with nitrogen and held at 25° C. Subsequently, 1.0 mL of trioctylaluminum (1 mmol/mL) and 0.001 mL of transition metal compound (2) were dissolved in 1.0 mL of toluene and added thereto and 0.002 mmol of triphenylmethyltetrakispentafluoroborate was dissolved in 1.0 mL of toluene and added thereto to initiate the polymerization. After reacting at 25° C. for 30 minutes, the polymerization was stopped by adding a small amount of isobutyl alcohol. After completion of the polymerization, the reaction product was placed in a mixed solvent of 5 L of acetone and 2 L of methanol to which 5 mL of concentrated hydrochloric acid was added to precipitate the whole amount of the polymer, which was stirred and then filtered. The obtained polymer was dried under reduced pressure at 80° C. for 10 hours to obtain 43 g of a norbornene/1-decene copolymer. The norbornene content in the produced copolymer was 68 mol %, the glass transition temperature measured by DSC was 195° C., and the weight average molecular weight (Mw) was 100,000.

Synthesis Example 3

40 mL of toluene was charged into a glass reactor sufficiently substituted with nitrogen, and the liquid phase and the gas phase were saturated with nitrogen at a flow rate of 30 L/h. Subsequently, 20.0 mL of tetracyclo[4.4.0. 1$^{2,5}$.1$^{7,10}$]-3-dodecene (TD), 55 mL of 1-hexene as an α-olefin, and 10 mmol of methylaluminoxane (MAO) in terms of aluminum atoms were added thereto. 0.010 mmol of a transition metal catalyst (2) dissolved in toluene was added thereto to initiate polymerization. Polymerization was continued at 25° C. for 15 minutes, then the polymerization was stopped by adding isobutyl alcohol thereto. The reaction product was placed in a mixed solvent of acetone/methanol (500 ml each) to which 0.5 ml concentrated hydrochloric acid was added to precipitate the whole amount of the polymer, which was stirred and then filtered through a glass filter. After drying the polymer under reduced pressure at 130° C. for 10 hours, a TD/1-hexene copolymer was obtained. The monomer composition in the polymer determined by NMR was 23 mol % TD and 77 mol % 1-hexene, and the glass transition temperature measured by DSC was 151° C.

Synthesis Example of Polymer A1

A polymerization reaction of a terpolymer formed of ethylene, propylene, and 5-vinyl-2-norbornene (VNB) was continuously carried out at 95° C. using a polymerization container with a volume of 300 L equipped with stirring blades.

Using hexane (feed rate 41 kg/h) as a polymerization solvent, continuous supply was carried out to the polymerization container with an ethylene feed rate of 5.3 kg/h, a propylene feed rate of 5.6 kg/h, and a VNB feed rate of 90 g/h. Using (t-butylamido)dimethyl (η5-2-methyl-s-indacen-1-yl)silanetitanium (II) 1,3-pentadiene as the main catalyst while keeping the polymerization pressure at 1.5 MPa, continuous supply was carried out to the polymerization container so as to be 0.05 mmol/h. In addition, continuously supply of each of $(C_6H_5)_3CB(C_6F_5)_4$ as a co-catalyst and triisobutyl aluminum (TIBA) as an organoaluminum compound was carried out to the polymerization container so as to be 0.25 mmol/h and 15 mmol/h, respectively.

In this manner, a polymerization solution including 16.6% by weight of a copolymer (polymer A1) formed of ethylene, propylene, and VNB was obtained. A small amount of methanol was added to polymerization solution withdrawn from the lower part of the polymerization container to stop the polymerization reaction and the polymer was separated from the solvent by a steam stripping treatment and then dried at 80° C. overnight under reduced pressure.

Synthesis Example of Polymer A2

[Preparation of Catalyst Component]

7.9 kg of silica dried at 250° C. for 10 hours was suspended in 121 liters of toluene and then cooled to 0° C. Thereafter, 41 liters of a toluene solution of methylaluminoxane (Al=1.47 mol/liter) was added dropwise thereto over 1 hour. At this time, the temperature inside the system was kept at 0° C. Subsequently, the mixture was reacted at 0° C. for 30 minutes, then the temperature was increased to 95° C. over 1.5 hours and reaction carries out at that temperature for 4 hours. Thereafter, the temperature was lowered to 60° C. and the supernatant liquid was removed by a decantation method. The solid component obtained in this manner was washed twice with toluene and then resuspended in 125 liters of toluene. 20 liters of a toluene solution (Zr=28.4 mmol/liter) of bis(1,3-dimethylcyclopentadienyl)zirconium dichloride was added dropwise to the system at 30° C. over 30 minutes, and a reaction was further carried out at 30° C. for 2 hours. Thereafter, the supernatant was removed and washed twice with hexane to obtain a solid catalyst containing 4.6 mg of zirconium per gram.

[Preparation of Prepolymerization Catalyst]

4.3 kg of the obtained solid catalyst described above was added to 160 liters of hexane containing 16 mol of triisobutylaluminum and ethylene prepolymerization was carried out at 35° C. for 3.5 hours to obtain a prepolymerized catalyst in which 3 g of ethylene polymer per 1 g of the solid catalyst was prepolymerized. The [q] of this ethylene polymer was 1.27 dl/g.

[Polymerization]

Using a continuous fluidized bed gas phase polymerization apparatus, the copolymerization of ethylene and propylene was carried out at a total pressure of 20 kg/cm²-G at a polymerization temperature of 80° C. The prepolymerized catalyst prepared as described above was continuously supplied at a rate of 0.048 mmol/h in terms of zirconium atoms along with triisobutylaluminum at a rate of 10 mmol/h, and ethylene, propylene, hydrogen, and nitrogen were continuously supplied in order to maintain a uniform gas composition during the polymerization (gas composition: propylene/ethylene=0.083, hydrogen/ethylene=0.0012, ethylene concentration=23%).

The yield of the obtained ethylene/propylene copolymer (polymer A2) was 5.3 kg/h, the density was 0.927 g/cm³, the MFR was 1.0 g/10 min, the number of unsaturated bonds was 0.062 per 1,000 carbon atoms and 0.06 per polymer molecule, the temperature at the maximum peak position of the endothermic curve measured by DSC was 117.2° C., and the decane soluble portion at 23° C. was 0.22% by mass.

Example 1

(Preparation of Varnish 1)

Using the cyclic olefin copolymer (m) obtained in Synthesis Example 1, the polymer 1 as the cyclic olefin copolymer (n), Percumyl D manufactured by NOF Corp. as a radical polymerization (cross-linking) initiator, Chimassorb 944 manufactured by BASF as weathering stabilizer 1, Irganox 1010 manufactured by BASF as weathering stabilizer 2, and xylene as a solvent, weighing was carried out in accordance with the blending compositions shown in Table 1. The weighed sample was charged into a 200 ml separable flask and stirred for 4 hours with a stirring blade at a rotation speed of 200 rpm until sufficiently dissolved to obtain a desired varnish cyclic olefin copolymer composition. The units of the blending ratios of the respective raw materials in Tables 1 to 3 are parts by mass.

(Formation of Film)

The obtained varnish cyclic olefin copolymer composition was coated on the release-treated PET film at a rate of 10 mm/sec and then dried in an air dryer under a nitrogen stream at 140° C. for 30 minutes. Next, the temperature was raised to 200° C. and heated for 1 hour to obtain a film formed of a cross-linked product. The obtained film was peeled off from the PET film, and dynamic viscoelasticity measurement and dielectric tangent measurement were carried out. The obtained results are shown in Table 1.

Comparative Example 1

Using the cyclic olefin copolymer (m) obtained in Synthesis Example 1, the ethylene/propylene/VNB copolymer obtained in the Synthesis Example of polymer A1, Percumyl D manufactured by NOF Corp. as a radical polymerization (cross-linking) initiator, Chimasorb 944 manufactured by BASF as weathering stabilizer 1, Irganox 1010 manufactured by BASF as weathering stabilizer 2, and xylene as a solvent, weighing was carried out in accordance with the blending compositions shown in Table 1. The weighed sample was charged into a 200 ml separable flask and stirred for 4 hours with a stirring blade at a rotation speed of 200 rpm until sufficiently dissolved to obtain a desired varnish cyclic olefin copolymer composition.

A film was prepared and evaluated in the same manner as in Example 1 except that the obtained varnish cyclic olefin copolymer composition was used. The obtained results are shown in Table 1.

Comparative Example 2

Evaluation was carried out in the same manner as in Comparative Example 1 except that the ethylene/propylene copolymer obtained in the Synthesis Example of Polymer A2 was used. The obtained results are shown in Table 1.

Examples 2 to 5

Films were respectively prepared in the same manner as in Example 1, except that the blending compositions were changed as shown in Table 1, and respectively evaluated. The obtained results are shown in Table 1.

Comparative Example 3

A film was prepared and evaluated in the same manner as in Example 1 except that the blending compositions were changed as shown in Table 1.

That is, a film was prepared using only the cyclic olefin copolymer (m) without adding the cyclic olefin copolymer (n), and the evaluation was carried out in the same manner as in Example 1.

Comparative Example 4

A film was prepared and evaluated in the same manner as in Example 1 except that the blending composition was changed as shown in Table 1.

That is, a film was prepared using only the cyclic olefin copolymer (n) without adding the cyclic olefin copolymer (m), and the evaluation was carried out in the same manner as in Example 1.

Examples 6 to 9

Films were prepared and evaluated in the same manner as in Example 1 except that the blending compositions were changed as shown in Table 2.

Examples 10 to 14

Films were prepared and evaluated in the same manner as in Example 1 except that the blending compositions were changed as shown in Table 3.

Example 15

(Preparation of Varnish 2)
The cyclic olefin copolymer (m) obtained in Synthesis Example 1, the polymer 1 as the cyclic olefin copolymer (n), Percumyl D manufactured by NOF Corp. as a radical polymerization initiator, Irganox 1010 manufactured by BASF as weathering stabilizer 2, and xylene as a solvent were weighed out in accordance with the blending composition shown in Table 4, charged into a 200 ml separable flask, and stirred for 4 hours with a stirring blade at a rotation speed of 200 rpm until sufficiently dissolved. Subsequently, flame retardant 1 (aluminum diethylphosphinate) and flame retardant 2 (melamine cyanurate) as flame retardants and filler 1 (crushed silica) as a filler were added, stirred, and mixed to obtain a slurry-like varnish 2.

(Preparation of Prepreg 1)
The obtained varnish 2 was impregnated in a glass cloth 1 and dried at 145° C. for 10 minutes in an air dryer to prepare a prepreg 1 having a thickness of 0.1 mm.

(Preparation of Laminate 1)
A laminate 1 was prepared by overlapping 8 sheets of the prepreg 1 cut out into 150 mm squares and carrying out heating at 200° C. for 2 hours under a pressure of 3.5 MPa with a vacuum press machine.

Example 16

(Preparation of Varnish 3)
The cyclic olefin copolymer (m) obtained in Synthesis Example 1, the polymer 1 as the cyclic olefin copolymer (n), Percumyl D manufactured by NOF Corp. as a radical polymerization initiator, and toluene and cyclohexane as a solvent were weighed in accordance with the blending composition shown in Table 4, charged into a 200 ml separable flask, and stirred for 4 hours with a stirring blade at a rotation speed of 200 rpm until sufficiently dissolved. Subsequently, flame retardant 3 (a bromine-based flame retardant) and flame retardant 4 ($SbO_3$) as flame retardants and a filler 1 (crushed silica) as a filler were added thereto and stirred and mixed to obtain a slurry-like varnish 3.

(Production of Prepreg 2)
The obtained varnish 3 was impregnated into the glass cloth 1 and dried at 120° C. for 10 minutes in an air dryer to prepare a prepreg 2 having a thickness of 0.1 mm.

(Production of Laminate 2)
A laminate 2 was prepared by overlapping 8 sheets of the prepreg 2 cut out into 150 mm squares and carrying out heating at 200° C. for 2 hours under a pressure of 3.5 MPa with a vacuum press machine.

Examples 17 to 20

Laminates were prepared and evaluated in the same manner as in Example 15 except that the blending compositions were changed as shown in Table 4.

Comparative Examples 5 and 6

Laminates were prepared and evaluated in the same manner as in Example 15 except that the blending compositions were changed as shown in Table 4. That is, the prepregs and the laminates were prepared only with the cyclic olefin copolymer (m) without adding the cyclic olefin copolymer (n), and the evaluation was carried out in the same manner as in Example 15.

TABLE 1

| Raw materials | | Example 1 | Comparative Example 1 | Comparative Example 2 | Example 2 | Example 3 | Example 4 | Example 5 | Comparative Example 3 | Comparative Example 4 |
|---|---|---|---|---|---|---|---|---|---|---|
| Cyclic olefin copolymer (m) | Synthesis Example 1 | 18 | 16 | 16 | 16 | 14 | 10 | 4 | 20 | — |
| Cyclic olefin copolymer (n) | Polymer 1 | 2 | — | — | 4 | 6 | 10 | 16 | — | 20 |
| Polymer A1 | | — | 4 | — | — | — | — | — | — | — |
| Polymer A2 | | — | — | 4 | — | — | — | — | — | — |
| Radical polymerization initiator | Cross-linking agent 1 | 1.08 | 0.96 | 0.96 | 0.96 | 0.84 | — | — | 1.2 | 1.2 |
| | Cross-linking agent 2 | — | — | — | — | — | 0.6 | 0.24 | — | — |
| Weathering stabilizer | Weathering stabilizer 1 | 0.04 | 0.04 | 0.04 | 0.04 | 0.04 | — | — | 0.04 | 0.04 |

TABLE 1-continued

| Raw materials | | Example 1 | Comparative Example 1 | Comparative Example 2 | Example 2 | Example 3 | Example 4 | Example 5 | Comparative Example 3 | Comparative Example 4 |
|---|---|---|---|---|---|---|---|---|---|---|
| | Weathering stabilizer 2 | 0.02 | 0.02 | 0.02 | — | 0.02 | 0.04 | — | 0.02 | 0.02 |
| | Weathering stabilizer 3 | — | — | — | 0.02 | — | — | 0.04 | — | — |
| | Weathering stabilizer 4 | — | — | — | — | — | 0.02 | 0.02 | — | — |
| Solvent | Xylene | 80 | 80 | 80 | 80 | 80 | 80 | 80 | 80 | 80 |
| Physical property evaluation | | | | | | | | | | |
| Dielectric tangent | | A | B | B | A | A | A | A | B | A |
| Storage elastic modulus | | A | A | B | A | A | A | A | A | B |

TABLE 2

| | | Example 6 | Example 7 | Example 8 | Example 9 |
|---|---|---|---|---|---|
| Raw materials | | | | | |
| Cyclic olefin copolymer (m) | Synthesis Example 1 | 15 | 12 | 14 | 8 |
| Cyclic olefin copolymer (n) | Polymer 2 | — | — | 3 | 4 |
| | Polymer 3 | 5 | — | 3 | — |
| | Polymer 4 | — | 8 | — | 8 |
| Radical polymerization initiator | Cross-linking agent 1 | — | 0.72 | — | 0.48 |
| | Cross-linking agent 3 | 0.9 | — | 0.84 | — |
| | Weathering stabilizer 1 | 0.04 | 0.04 | — | — |
| Weathering stabilizer | Weathering stabilizer 2 | 0.02 | 0.02 | 0.04 | 0.04 |
| | Weathering stabilizer 4 | — | — | 0.02 | 0.02 |
| Solvent | Xylene | 80 | 80 | 80 | 80 |
| Physical property evaluation | | | | | |
| Dielectric tangent | | A | A | A | A |
| Storage elastic modulus | | A | A | A | A |

TABLE 3

| Raw materials | | Example 10 | Example 11 | Example 12 | Example 13 | Example 14 |
|---|---|---|---|---|---|---|
| Cyclic olefin copolymer (m) | Synthesis Example 1 | 8 | 10 | 14 | 14 | 12 |
| Cyclic olefin copolymer (n) | Polymer 1 | 12 | 10 | 6 | 6 | 8 |
| Elastomer component | Elastomer 1 | 2 | — | — | — | — |
| | Elastomer 2 | — | 8 | — | — | — |
| | Elastomer 3 | — | — | 6 | — | — |
| | Elastomer 4 | — | — | — | 4 | — |
| | Elastomer 5 | — | — | — | — | 5 |
| Radical polymerization initiator | Cross-linking agent 1 | 0.48 | 0.6 | 0.84 | 0.84 | 0.72 |
| Weathering stabilizer | Weathering stabilizer 1 | 0.04 | — | 0.04 | 0.04 | — |
| | Weathering stabilizer 2 | 0.02 | 0.04 | 0.02 | 0.02 | 0.04 |
| | Weathering stabilizer 4 | — | 0.02 | — | — | 0.02 |
| Solvent | Xylene | 80 | 80 | 80 | 80 | 80 |
| Physical property evaluation | | | | | | |
| Dielectric tangent | | A | A | A | A | A |
| Storage elastic modulus | | A | A | A | A | A |

TABLE 4

| Raw materials | | Example 15 | Example 16 | Example 17 | Example 18 | Example 19 | Example 20 | Comparative Example 5 | Comparative Example 6 |
|---|---|---|---|---|---|---|---|---|---|
| Cyclic olefin copolymer (m) | Synthesis Example 1 | 18 | 14 | 10 | 15 | 14 | 16 | 20 | 20 |
| Cyclic olefin copolymer (n) | Polymer 1 | 2 | 6 | 10 | — | — | — | — | — |
| | Polymer 2 | — | — | — | 5 | — | — | — | — |
| | Polymer 5 | — | — | — | — | 6 | — | — | — |
| | Polymer 6 | — | — | — | — | — | 4 | — | — |

TABLE 4-continued

| Raw materials | | Example 15 | Example 16 | Example 17 | Example 18 | Example 19 | Example 20 | Comparative Example 5 | Comparative Example 6 |
|---|---|---|---|---|---|---|---|---|---|
| Elastomer component | Elastomer 3 | — | — | — | 6 | — | — | — | — |
| | Elastomer 4 | — | — | — | — | 4 | — | — | 4 |
| Radical polymerization initiator | Cross-linking agent 1 | 0.46 | 0.42 | 0.35 | 0.45 | 0.42 | 0.45 | 0.6 | 0.6 |
| Weathering stabilizer | Weathering stabilizer 1 | — | — | 0.02 | — | 0.02 | — | 0.02 | 0.04 |
| | Weathering stabilizer 2 | 0.02 | — | 0.01 | — | 0.01 | 0.01 | — | 0.02 |
| Flame retardant | Flame retardant 1 | 14 | — | — | 14 | — | 14 | 14 | — |
| | Flame retardant 2 | 20 | — | — | 20 | — | 20 | 20 | — |
| | Flame retardant 3 | — | 8 | 8 | — | 8 | — | 8 | 8 |
| | Flame retardant 4 | — | 2 | 2 | — | 2 | — | 2 | 2 |
| Filler | Filler 1 | 5 | 5 | 5 | 7.5 | 7.5 | — | 5 | 7.5 |
| Solvent | Xylene | 80 | — | 80 | 80 | — | — | 80 | — |
| | Toluene | — | 64 | — | — | 64 | 80 | — | 64 |
| | Cyclohexane | — | 16 | — | — | 16 | — | — | 16 |
| Physical property evaluation | | | | | | | | | |
| Dielectric tangent (12 GHz) | | A | A | A | A | A | A | B | B |
| Storage elastic modulus | | A | A | A | A | A | A | A | A |

This application claims priority based on Japanese Patent Application No. 2016-037462 filed on Feb. 29, 2016 and Japanese Patent Application No. 2016-169312 filed on Aug. 31, 2016 and the entirety of these disclosures is incorporated herein.

The invention claimed is:

1. A cyclic olefin copolymer composition comprising:

a cyclic olefin copolymer (m); and a cyclic olefin copolymer (n) different from the cyclic olefin copolymer (m), wherein the cyclic olefin copolymer (m) includes (A) a repeating unit derived from one or more olefins represented by General Formula (I), (B) a repeating unit derived from one or more cyclic non-conjugated dienes represented by General Formula (III), and (C) a repeating unit derived from one or more cyclic olefins represented by General Formula (V), when a total molar number of the repeating units in the cyclic olefin copolymer (m) is 100 mol %, a content of the repeating unit (A) derived from the olefins is 10 mol % or more to 90 mol % or less, a content of the repeating unit (B) derived from the cyclic non-conjugated dienes is 1 mol % or more to 40 mol % or less, and a content of the repeating unit (C) derived from the cyclic olefins is 1 mol % or more to 30 mol % or less, the cyclic olefin copolymer (n) includes at least one selected from a copolymer (n1) of ethylene or α-olefin and cyclic olefin (where the copolymer (n1) does not include a repeating unit derived from cyclic non-conjugated dienes represented by General Formula (III) and a cyclic olefin ring-opening polymer (n2), and when a total amount of the cyclic olefin copolymer (m) and the cyclic olefin copolymer (n) is 100% by mass, a content of the cyclic olefin copolymer (m) is 5% by mass or more to 95% by mass or less, and a content of the cyclic olefin copolymer (n) is 5% by mass or more to 95% by mass or less

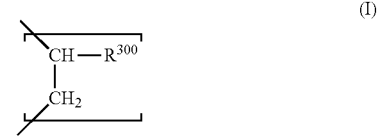

(in General Formula (I), $R^{300}$ indicates a hydrogen atom or a linear or branched hydrocarbon group having 1 to 29 carbon atoms)

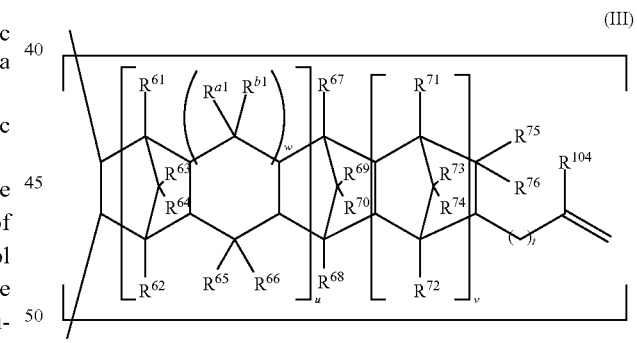

(in General Formula (III), u is 0 or 1, v is 0 or a positive integer, w is 0 or 1, $R^{61}$ to $R^{76}$ and $R^{a1}$ and $R^{b1}$, which may be the same or different, are a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, $R^{104}$ is a hydrogen atom or an alkyl group having 1 to 10 carbon atoms, t is a positive integer of 0 to 10, and $R^{75}$ and $R^{76}$ may bond with each other to form a monocyclic or polycyclic ring)

(V)

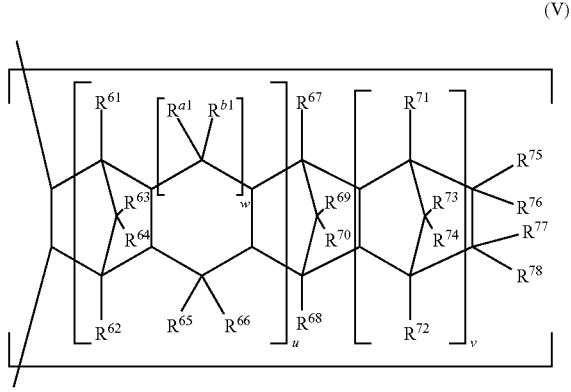

(in General Formula (V), u is 0 or 1, v is 0 or a positive integer, w is 0 or 1, $R^{61}$ to $R^{78}$ and $R^{a1}$ and $R^{b1}$, which may be the same or different, are a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, and $R^{75}$ to $R^{78}$ may bond with each other to form a monocyclic or polycyclic ring).

2. The cyclic olefin copolymer composition according to claim 1,
wherein the cyclic non-conjugated diene of the repeating unit (B) derived from the cyclic non-conjugated dienes is 5-vinyl-2-norbornene or 8-vinyl-9-methyltetracyclo [$4.4.0.1^{2,5}.1^{7,10}$]-3-dodecene.

3. The cyclic olefin copolymer composition according to claim 1,
wherein the cyclic olefin of the repeating unit (C) derived from the cyclic olefins is bicyclo[2.2.1]-2-heptene or tetracyclo[$4.4.0.1^{2,5}.1^{7,10}$]-3-dodecene.

4. The cyclic olefin copolymer composition according to claim 1, further comprising:
an elastomer.

5. The cyclic olefin copolymer composition according to claim 4,
wherein a content of the elastomer is 1 part by mass or more to 50 parts by mass or less when the entire cyclic olefin copolymer composition is 100 parts by mass.

6. The cyclic olefin copolymer composition according to claim 4,
wherein the elastomer includes one or two or more selected from styrene-based elastomers, ethylene/propylene elastomers, and diene-based elastomers.

7. The cyclic olefin copolymer composition according to claim 1, further comprising:
one or two or more additives selected from the group consisting of heat resistance stabilizers, weathering stabilizers, radiation resistant agents, plasticizers, lubricants, releasing agents, nucleating agents, frictional abrasion-improving agents, flame retardants, foaming agents, antistatic agents, coloring agents, anti-fogging agents, anti-blocking agents, impact resistance agents, surface wetting improvers, fillers, hydrochloric acid absorbers, and metal deactivators.

8. A varnish comprising:
the cyclic olefin copolymer composition according to claim 1; and
a solvent.

9. A cross-linked product of the cyclic olefin copolymer composition according to claim 1.

10. A film or sheet comprising:
the cross-linked product according to claim 9.

11. A laminate obtained by laminating the film or sheet according to claim 10 on a substrate.

12. A circuit substrate comprising:
an electrically insulating layer including the cross-linked product according to claim 9; and
a conductor layer provided on the electrically insulating layer.

13. An electronic device comprising:
the circuit substrate according to claim 12.

14. A prepreg comprising:
the cyclic olefin copolymer composition according to claim 1; and
a sheet-like fiber substrate.

15. A foamed product obtained by cross-linking and foaming the cyclic olefin copolymer composition according to claim 1.

16. A multi-layer formed article or a multi-layer laminated film obtained by forming the cyclic olefin copolymer composition according to claim 1 with a thickness of 100 μm or less on a surface layer.

* * * * *